US012578551B2

(12) United States Patent
Hsueh et al.

(10) Patent No.: US 12,578,551 B2
(45) Date of Patent: Mar. 17, 2026

(54) OPTICAL LENS SYSTEM AND TIME OF FLIGHT SENSING MODULE

(71) Applicant: LARGAN PRECISION CO., LTD., Taichung City (TW)

(72) Inventors: Chun-Che Hsueh, Taichung City (TW); Jin Sen Wang, Taichung City (TW); Hsin-Hsuan Huang, Taichung City (TW); Fuh-Shyang Yang, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 227 days.

(21) Appl. No.: 18/110,877

(22) Filed: Feb. 16, 2023

(65) Prior Publication Data

US 2023/0194834 A1 Jun. 22, 2023

Related U.S. Application Data

(63) Continuation of application No. 17/480,567, filed on Sep. 21, 2021, now Pat. No. 12,411,312.

(30) Foreign Application Priority Data

Apr. 23, 2021 (TW) .................................. 110114770

(51) Int. Cl.
G02B 13/00 (2006.01)
G01S 17/894 (2020.01)
(Continued)

(52) U.S. Cl.
CPC .......... G02B 13/003 (2013.01); G01S 17/894 (2020.01); G02B 9/06 (2013.01); G02B 27/0025 (2013.01)

(58) Field of Classification Search
CPC .... G02B 13/003; G02B 9/06; G02B 27/0025; G02B 13/0065; G02B 13/0015;
(Continued)

(56) References Cited

U.S. PATENT DOCUMENTS 3,994,573 A 11/1976 Kohayakawa et al.
9,645,354 B2 5/2017 Liao et al.
(Continued)

FOREIGN PATENT DOCUMENTS

CN 1837883 * 9/2006 ............. G02B 13/18
CN 201773214 U 3/2011
(Continued)

OTHER PUBLICATIONS

English translation of JP-2003005026-A (Year:Jan. 8, 2003).*
(Continued)

*Primary Examiner* — Cara E Rakowski
*Assistant Examiner* — Kuei-Jen L Edenfield
(74) *Attorney, Agent, or Firm* — Maschoff Brennan

(57) ABSTRACT

An optical lens system includes two lens elements which are, in order from an object side to an image side along an optical path: a first lens element and a second lens element. Each of the two lens elements has an object-side surface facing toward the object side and an image-side surface facing toward the image side. At least one of the object-side surface and the image-side surface of at least one lens element of the optical lens system is aspheric. A total number of the lens elements in the optical lens system is two.

20 Claims, 33 Drawing Sheets

(51) Int. Cl.
    G02B 9/06     (2006.01)
    G02B 27/00     (2006.01)

(58) Field of Classification Search
    CPC ........ G02B 13/18; G02B 13/00; G02B 27/00;
                 G02B 13/14; G02B 13/146; G02B 9/10;
                  G02B 9/04; G01S 17/894; G01S 7/4816;
                  G01S 7/481; G01S 17/08
    USPC ....... 359/739, 793, 794, 717, 350, 356, 227,
                                                  359/233
    See application file for complete search history.

(56)                References Cited

U.S. PATENT DOCUMENTS

| | | | |
|---|---|---|---|
| 10,095,022 B2 | 10/2018 | Jhang et al. | |
| 10,846,965 B2 | 11/2020 | Chiu et al. | |
| 2012/0154930 A1* | 6/2012 | Ko ......................... | G02B 13/18 |
| | | | 359/717 |
| 2014/0376112 A1 | 12/2014 | Tsai | |
| 2017/0090153 A1* | 3/2017 | Liao ................... | G02B 27/0025 |
| 2018/0088313 A1 | 3/2018 | Uhang et al. | |
| 2019/0011680 A1* | 1/2019 | Tsai ....................... | G02B 13/14 |
| 2020/0049949 A1 | 2/2020 | Tsai et al. | |

FOREIGN PATENT DOCUMENTS

| | | | | | |
|---|---|---|---|---|---|
| CN | 203561787 U | | 4/2014 | | |
| CN | 109581626 A | | 4/2019 | | |
| CN | 110658606 A | | 1/2020 | | |
| CN | 110737080 A | | 1/2020 | | |
| JP | S58-14109 A | | 1/1983 | | |
| JP | H02-73324 A | | 3/1990 | | |
| JP | 2003005026 A | * | 1/2003 | ............. | G02B 13/18 |
| JP | 2004004620 A | * | 1/2004 | ............. | G02B 13/04 |
| JP | 2010-262218 A | | 11/2010 | | |
| TW | 201712386 A | | 4/2017 | | |
| TW | 201732367 A | | 9/2017 | | |
| TW | 202001317 A | | 1/2020 | | |
| TW | 202001334 A | | 1/2020 | | |

OTHER PUBLICATIONS

English translation of CN1837883 (Year:Sep. 27, 2006).*
English translation of JP2004004620 (Year:Jan. 8, 2004).*
TW Office Action dated Aug. 31, 2021 as received in Application No. 110114770.
IN Patent Examination Report dated Nov. 14, 2022 as received in Application No. 202134057124.

* cited by examiner

OPTICAL LENS SYSTEM AND TIME OF FLIGHT SENSING MODULE

RELATED APPLICATIONS

This application is a continuation patent application of U.S. application Ser. No. 17/480,567, filed on Sep. 21, 2021, which claims priority to Taiwan Application 110114770, filed on Apr. 23, 2021, which is incorporated by reference herein in its entirety.

BACKGROUND

Technical Field

The present disclosure relates to an optical lens system and a time of flight (ToF) sensing module, more particularly to an optical lens system applicable to a time of flight sensing module.

Description of Related Art

With the development of technology, electronic devices have been improved in diverse application in accordance with the various requirements, such as safety, convenience and even entertainment of daily life. For this purpose, a time of flight sensing module becomes one of the indispensable features of an electronic device nowadays.

Furthermore, due to the rapid changes in technology, electronic devices equipped with time of flight sensing modules are trending towards multi-functionality for various applications, and therefore the functionality requirements for the receiver of the time of flight sensing modules have become stricter. However, a conventional receiver of a time of flight sensing module has its performance limitation in the receiving quality, receiving distance and image recognition, or the size of the time of flight sensing module cannot meet the market demands, such that the application scope and field of the time of flight sensing module are restricted.

SUMMARY

According to one aspect of the present disclosure, an optical lens system includes two lens elements. The two lens elements are, in order from an object side to an image side along an optical path, a first lens element and a second lens element. Each of the two lens elements has an object-side surface facing toward the object side and an image-side surface facing toward the image side. At least one of the object-side surface and the image-side surface of at least one lens element of the optical lens system is aspheric. The total number of the lens elements in the optical lens system is two.

When an Abbe number of the first lens element is V1, a refractive index of the first lens element is N1, an entrance pupil diameter of the optical lens system is EPD, a maximum image height of the optical lens system is ImgH, a focal length of the optical lens system is f, and an axial distance between the object-side surface of the first lens element and an image surface is TL, the following conditions are satisfied:

$$5.0 < V1/N1 < 33.0;$$

$$0.60 < EPD/ImgH < 10.0;$$

$$0.50 < f/EPD < 2.10; \text{ and}$$

$$0.10 \text{ [mm]} < TL < 3.0 \text{ [mm]}.$$

According to another aspect of the present disclosure, an optical lens system includes two lens elements. The two lens elements are, in order from an object side to an image side along an optical path, a first lens element and a second lens element. Each of the two lens elements has an object-side surface facing toward the object side and an image-side surface facing toward the image side. At least one of the object-side surface and the image-side surface of at least one lens element of the optical lens system is aspheric. The total number of the lens elements in the optical lens system is two.

When an Abbe number of the first lens element is V1, a refractive index of the first lens element is N1, an axial distance between the first lens element and the second lens element is T12, a central thickness of the first lens element is CT1, an axial distance between the image-side surface of the second lens element and an image surface is BL, an axial distance between the object-side surface of the first lens element and the image surface is TL, a maximum image height of the optical lens system is ImgH, a focal length of the optical lens system is f, and an entrance pupil diameter of the optical lens system is EPD, the following conditions are satisfied:

$$5.0 < V1/N1 < 18.0;$$

$$0 < T12/CT1 < 0.7;$$

$$0 < BL/TL < 0.4;$$

$$1.0 < TL/ImgH < 4.0; \text{ and}$$

$$0.50 < f/EPD < 2.10.$$

According to another aspect of the present disclosure, a time of flight sensing module includes an emitter and a receiver. The emitter includes a vertical-cavity surface-emitting laser light source. The receiver includes one of the aforementioned optical lens systems.

According to another aspect of the present disclosure, a time of flight sensing module includes an emitter and a receiver. The emitter includes a light source. The receiver includes an optical lens system and an image sensor. The optical lens system includes a lens accommodation apparatus and at least one lens element disposed in the lens accommodation apparatus. At least one of an object-side surface and an image-side surface of the at least one lens element is aspheric. The image sensor is disposed on an image surface of the optical lens system. The image sensor includes at least four sensing cells. A height of the time of flight sensing module is smaller than 3.0 millimeters.

When a focal length of the optical lens system is f, and an entrance pupil diameter of the optical lens system is EPD, the following condition is satisfied:

$$0.50 < f/EPD < 1.50.$$

BRIEF DESCRIPTION OF THE DRAWINGS

The disclosure can be better understood by reading the following detailed description of the embodiments, with reference made to the accompanying drawings as follows.

DETAILED DESCRIPTION

An optical lens system includes at least one lens element. Moreover, the optical lens system can include two lens elements, and the total number of the lens elements in the optical lens system can be two. The two lens elements are, in order from an object side to an image side along an optical path, a first lens element and a second lens element. Each of the two lens elements has an object-side surface facing toward the object side and an image-side surface facing toward the image side.

The first lens element can have positive refractive power. Therefore, it is favorable for providing light convergence so as to reduce the total track length of the optical lens system. The image-side surface of the first lens element can be convex in a paraxial region thereof. Therefore, it is favorable for obtaining field of view with a relatively wide range while reducing the total track length of the optical lens system.

The second lens element can have positive refractive power. Therefore, it is favorable for controlling incident angle on an image surface so as to balance brightness at different imaging positions. The object-side surface of the second lens element can be concave in a paraxial region thereof, and the image-side surface of the second lens element can be convex in a paraxial region thereof. Therefore, it is favorable for controlling the spot size at image periphery so as to correctly identify distance information.

According to the present disclosure, at least one of the object-side surface and the image-side surface of at least one lens element of the optical lens system is aspheric. Therefore, it is favorable for increasing the shape variation of the lens element so as to miniaturize the optical lens system and improve image quality.

Figure 30:
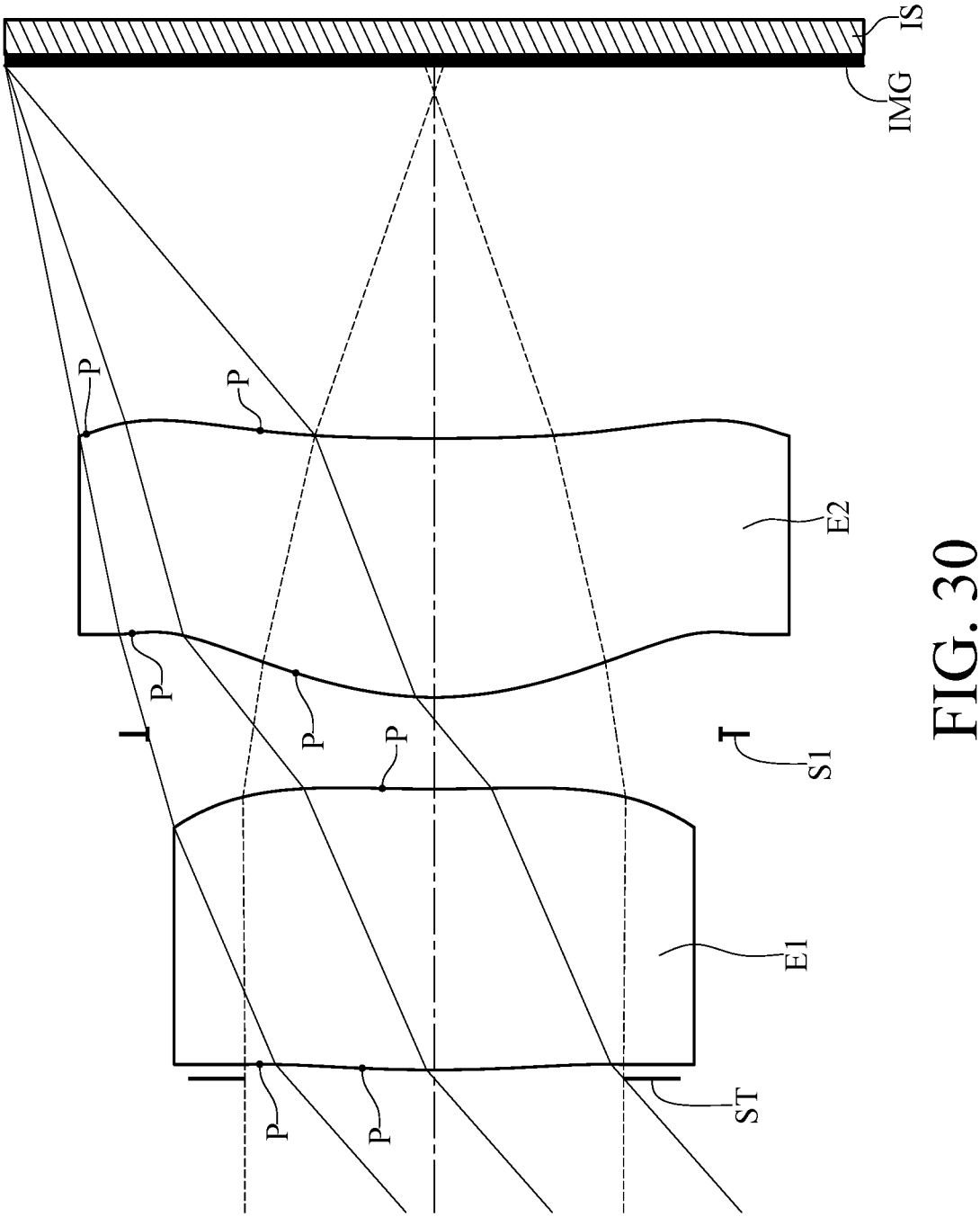
FIG. 30 shows a schematic view of inflection points of the lens elements according to the 1st embodiment of the present disclosure.

According to the present disclosure, at least one of the object-side surface and the image-side surface of at least one lens element of the optical lens system can have at least one inflection point. Therefore, it is favorable for increasing design flexibility of the optical lens system and reducing the overall size. Moreover, at least one of the object-side surface and the image-side surface of the second lens element can have at least one inflection point. Therefore, it is favorable for using the second lens element to control peripheral light at the sensing side, thereby increasing sensing response and prevent crosstalk due to light with a relatively large incident angle. Please refer to FIG. 30, which shows a schematic view of inflection points P of the first lens element E1 and the second lens element E2 according to the 1st embodiment of the present disclosure. The inflection points on the first lens element E1 and the second lens element E2 in FIG. 30 are only exemplary. The other lens element(s) may also have one or more inflection points.

According to the present disclosure, at least one lens element of the optical lens system can be made of plastic material. Therefore, it is favorable for increasing design flexibility of the lens element so as to achieve more detailed recognition ability. Moreover, the abovementioned lens element having at least one of the aspheric object-side surface and the aspheric image-side surface can be made of plastic material by injection molding. Therefore, it is favorable for increasing feasibility of mass production.

According to the present disclosure, the optical lens system can be operated within a wavelength of 700 nanometers to 1500 nanometers. Therefore, it is favorable for providing incident light with a specific wavelength, which is distinguishable from the wavelength of the visible light, so as to reduce the influence of environment and improve recognition accuracy. In some embodiments, the optical lens system can also be operated within a wavelength of 850 nanometers to 1000 nanometers. In some other embodiments, the optical lens system can also be operated within a wavelength of 900 nanometers to 980 nanometers.

When an Abbe number of the first lens element is V1, and a refractive index of the first lens element is N1, the following condition can be satisfied: $5.0<V1/N1<33.0$. Therefore, it is favorable for providing a proper refractive power configuration of the first lens element so as to reduce the total track length of the optical lens system. Moreover, the following condition can also be satisfied: $5.0<V1/N1<25.0$. Moreover, the following condition can also be satisfied: $5.0<V1/N1<18.0$. Moreover, the following condition can also be satisfied: $5.0<V1/N1<15.0$. According to the present disclosure, an Abbe number V of one lens element can be obtained from the following equation: $V=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When an entrance pupil diameter of the optical lens system is EPD, and a maximum image height of the optical lens system (which can be half of a diagonal length of an effective photosensitive area of the image sensor) is ImgH, the following condition can be satisfied: $0.60<EPD/ImgH<10.0$. Therefore, it is favorable for increasing the amount of light incident into the optical lens system so as to increase illuminance at image periphery. Moreover, the following condition can also be satisfied: $0.60<EPD/ImgH<5.0$. Moreover, the following condition can also be satisfied: $0.60<EPD/ImgH<2.0$. Moreover, the following condition can also be satisfied: $0.60<EPD/ImgH<1.50$.

When a focal length of the optical lens system is f, and the entrance pupil diameter of the optical lens system is EPD, the following condition is satisfied: $0.50<f/EPD<2.10$. Therefore, it is favorable for obtaining a balance of image brightness between the center and periphery of the optical lens system so as to ensure the equivalent sensing sensitivity therebetween. Moreover, the following condition can also be satisfied: $0.50<f/EPD<1.80$. Moreover, the following condition can also be satisfied: $0.50<f/EPD<1.50$. Moreover, the following condition can also be satisfied: $0.50<f/EPD<1.35$. Moreover, the following condition can also be satisfied: $0.60<f/EPD<1.80$.

When an axial distance between the object-side surface of the first lens element and the image surface is TL, the following condition can be satisfied: $0.10$ [mm]$<TL<3.0$ [mm]. Therefore, it is favorable for effectively reducing the size of the optical lens system while having a fine recognition ability.

When an axial distance between the first lens element and the second lens element is T12, and a central thickness of the first lens element is CT1, the following condition can be satisfied: $0<T12/CT1<0.7$. Therefore, it is favorable for balancing thickness of the first lens element and distance between lens elements so as to provide good manufacturability and control the total track length of the optical lens system. Moreover, the following condition can also be satisfied: $0.19<T12/CT1<0.7$.

When an axial distance between a lens surface of all lens elements of the optical lens system closest to the image surface and the image surface is BL, and the axial distance between the object-side surface of the first lens element and the image surface is TL, the following condition can be satisfied: $0<BL/TL<0.4$. Therefore, it is favorable for reducing the back focal length so as to further reduce the total track length of the optical lens system. When the total number of the lens elements in the optical lens system is two, the lens surface of all lens elements of the optical lens system closest to the image surface is the image-side surface of the second lens element.

When the axial distance between the object-side surface of the first lens element and the image surface is TL, and the maximum image height of the optical lens system is ImgH, the following condition can be satisfied: $1.0<TL/ImgH<4.0$. Therefore, it is favorable for effectively reducing the total track length of the optical lens system while maintaining a sufficient incident light amount. Moreover, the following condition can also be satisfied: $1.0<TL/ImgH<3.50$. Moreover, the following condition can also be satisfied: $1.70<TL/ImgH<3.0$.

When an Abbe number of one lens element of the optical lens system is Vi, a refractive index of the one lens element is Ni, and a minimum value of Vi/Ni is (Vi/Ni)min, the following condition can be satisfied: $(Vi/Ni)min<13.0$. Therefore, it is favorable for increasing the light path control ability of the lens element of the optical lens system so as to effectively control the spot size in a limited space. Moreover, the following condition can also be satisfied: $(Vi/Ni)min<12.0$. Moreover, Vi can be considered as an Abbe number of the i-th lens element, and Ni can be considered as a refractive index of the i-th lens element. When the total number of the lens elements in the optical lens system is two, the Abbe number of the first lens element is V1, an Abbe number of the second lens element is V2, the refractive index of the first lens element is N1, a refractive index of the second lens element is N2, and the minimum value of Vi/Ni is (Vi/Ni)min, wherein i=1 or 2.

When the entrance pupil diameter of the optical lens system is EPD, and a maximum value among central thicknesses of all lens elements of the optical lens system is CTmax, the following condition can be satisfied: $0.80<EPD/CTmax<1.80$. Therefore, it is favorable for having a great amount of incident light in a limited space so as to provide a fast and accurate distance identification ability in dark places. Moreover, the following condition can also be satisfied: $0.90<EPD/CTmax<1.50$.

When a focal length of the first lens element is f1, and a focal length of the second lens element is f2, the following condition can be satisfied: $-0.30<f1/f2<0.50$. Therefore, it is favorable for having a strong light path control ability of the first lens element so as to meet the requirement of the total track length of the optical lens system. Moreover, the following condition can also be satisfied: $-0.20 < f1/f2 < 0.40$.

When the Abbe number of the second lens element is V2, the following condition can be satisfied: $5.0 < V2 < 50.0$. Therefore, it is favorable for ensuring the second lens element for controlling the back focal length so as to satisfy the specification requirements. Moreover, the following condition can also be satisfied: $5.0 < V2 < 40.0$. Moreover, the following condition can also be satisfied: $10.0 < V2 < 30.0$. Moreover, the following condition can also be satisfied: $10.0 < V2 < 22.0$.

According to the present disclosure, the optical lens system can further include an aperture stop. When an axial distance between the aperture stop and the lens surface of all lens elements of the optical lens system closest to the image surface is SD, and an axial distance between the object-side surface of the first lens element and the lens surface of all lens elements of the optical lens system closest to the image surface is TD, the following condition can be satisfied: $0.75 < SD/TD < 1.20$. Therefore, it is favorable for controlling the position of the aperture stop so as to maximize the aperture of the optical lens system for receiving more light. Moreover, the following condition can also be satisfied: $0.85 < SD/TD < 1.10$. Moreover, the following condition can also be satisfied: $0.95 < SD/TD < 1.10$. Moreover, the following condition can also be satisfied: $1.0 \leq SD/TD < 1.10$.

When a maximum value among refractive indices of all lens elements of the optical lens system is Nmax, the following condition can be satisfied: $1.50 < Nmax < 1.80$. Therefore, it is favorable for effectively controlling the manufacturing difficulty of lens elements, ensuring the feasibility of mass production for the optical lens system. Moreover, the following condition can also be satisfied: $1.60 < Nmax < 1.75$. Moreover, the following condition can also be satisfied: $1.68 \leq Nmax < 1.70$.

When the axial distance between the object-side surface of the first lens element and the lens surface of all lens elements of the optical lens system closest to the image surface is TD, and the entrance pupil diameter of the optical lens system is EPD, the following condition can be satisfied: $1.50 < TD/EPD < 2.0$. Therefore, it is favorable for effectively balancing image brightness and the size of the optical lens system, such that the device can be applied in low-light environments while having a good recognition ability.

When the entrance pupil diameter of the optical lens system is EPD, and the axial distance between the first lens element and the second lens element is T12, the following condition can be satisfied: $3.0 < EPD/T12 < 10.0$. Therefore, it is favorable for effectively controlling distance between lens elements so as to prevent space waste and lens interference.

When the axial distance between the object-side surface of the first lens element and the image surface is TL, and the focal length of the optical lens system is f, the following condition can be satisfied: $0.8 < TL/f < 2.5$. Therefore, it is favorable for having a proper total track length and a proper focus range of the camera lens for various applications.

When the entrance pupil diameter of the optical lens system is EPD, and a maximum value among maximum effective radii of all lens surfaces of the optical lens system is Ymax, the following condition can be satisfied: $0.8 < EPD/Ymax < 2.0$. Therefore, it is favorable for controlling the outer diameter of the camera lens so as to miniaturize the sensing module; and it is also favorable for having a large aperture configuration so as to provide measurement data quickly and accurately.

When the Abbe number of the second lens element is V2, and the refractive index of the second lens element is N2, the following condition can be satisfied: $3.0 < V2/N2 < 18.0$. Therefore, it is favorable for ensuring the second lens element to provide a sufficient light convergence ability for the sensing side.

When a sum of Abbe numbers of all lens elements of the optical lens system is $\Sigma Vi$, the following condition can be satisfied: $10.0 < \Sigma Vi < 50.0$. Therefore, it is favorable for balancing the material configuration of the optical lens system so as to achieve efficient sensing function. Moreover, the following condition can also be satisfied: $20.0 < \Sigma Vi < 42.0$. Moreover, Vi can be considered as the Abbe number of the i-th lens element. When the total number of the lens elements in the optical lens system is two, the Abbe number of the first lens element is V1, the Abbe number of the second lens element is V2, and $\Sigma Vi = V1 + V2$.

When a maximum field of view of the optical lens system is FOV, the following condition can be satisfied: $58 \text{ [deg.]} < FOV < 180 \text{ [deg.]}$. Therefore, it is favorable for effectively controlling the field of view for achieving a wide recognition range. Moreover, the following condition can also be satisfied: $60 \text{ [deg.]} < FOV < 110 \text{ [deg.]}$. Moreover, the following condition can also be satisfied: $65 \text{ [deg.]} < FOV < 100 \text{ [deg.]}$.

When the entrance pupil diameter of the optical lens system is EPD, and the axial distance between the lens surface of all lens elements of the optical lens system closest to the image surface and the image surface is BL, the following condition can be satisfied: $0.75 < EPD/BL < 5.0$. Therefore, it is favorable for balancing spot size and relative illumination. Moreover, the following condition can also be satisfied: $0.85 < EPD/BL < 4.0$. Moreover, the following condition can also be satisfied: $0.95 < EPD/BL < 2.0$.

When a relative illumination on an image periphery of the optical lens system is RI, the following condition can be satisfied: $50\% < RI$. Therefore, it is favorable for increasing illuminance at the image periphery so as to ensure accuracy of recognized data therefrom. Moreover, the following condition can also be satisfied: $60\% < RI$.

According to the present disclosure, the optical lens system can be applied to a receiver of a time of flight sensing module. A typical time of flight sensing module are generally equipped with a diffractive optical element so as to receive sensing signals reflected by objects. However, the resolution of the diffractive optical element is too low to provide imaging function, such that the diffractive optical element can only meet the sensing requirements. Further, since the wavelength band used by the time of flight sensing module is quite narrow, the time of flight sensing module needs not to consider aberrations such as chromatic aberration. In contrast, the optical lens system disclosed in the present disclosure can meet the sensing requirement for the time of flight sensing module by using the lens element configuration in the restricted specification of a low total track length, and the resolution of the optical lens system disclosed in the present disclosure can even be increased so as to generate image of the measured object.

According to the present disclosure, the aforementioned features and conditions can be utilized in numerous combinations so as to achieve corresponding effects.

According to the present disclosure, the lens elements of the optical lens system can be made of either glass or plastic material. When the lens elements are made of glass material, the refractive power distribution of the optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. In addition, the additive may also be coated on the lens surfaces so as to provide abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the optical lens system and the time of flight sensing module are not specifically defined, these parameters may be determined according to the operating wavelength range.

According to the present disclosure, an inflection point is a point on the surface of the lens element at which the surface changes from concave to convex, or vice versa.

According to the present disclosure, the image surface of the optical lens system, based on the corresponding image sensor, can be flat or curved, especially a curved surface being concave facing towards the object side of the optical lens system.

According to the present disclosure, an image correction unit, such as a field flattener, can be optionally disposed between the lens element closest to the image side of the optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the time of flight sensing module.

In general, a preferable image correction unit is, for example, a thin transparent element having a concave object-side surface and a planar image-side surface, and the thin transparent element is disposed near the image surface.

Figure 31:
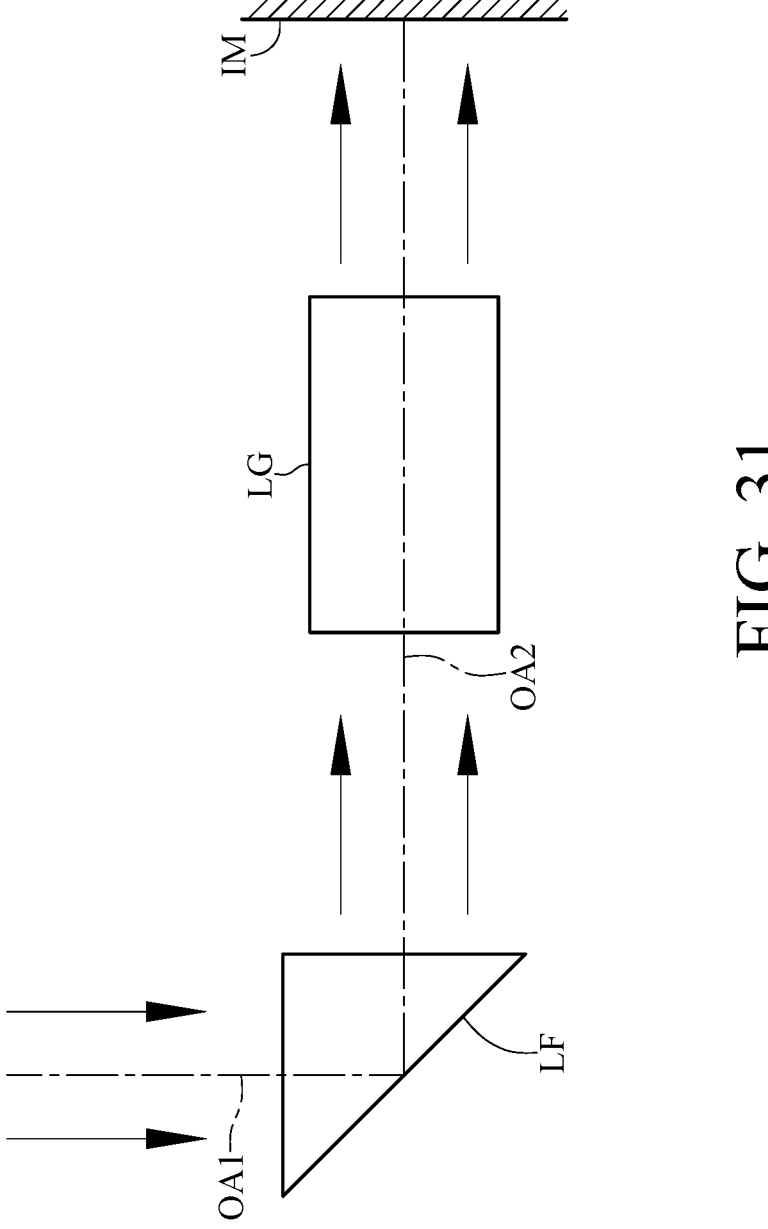
FIG. 31 shows a schematic view of a configuration of a light-folding element in an optical lens system according to one embodiment of the present disclosure.
Figure 32:
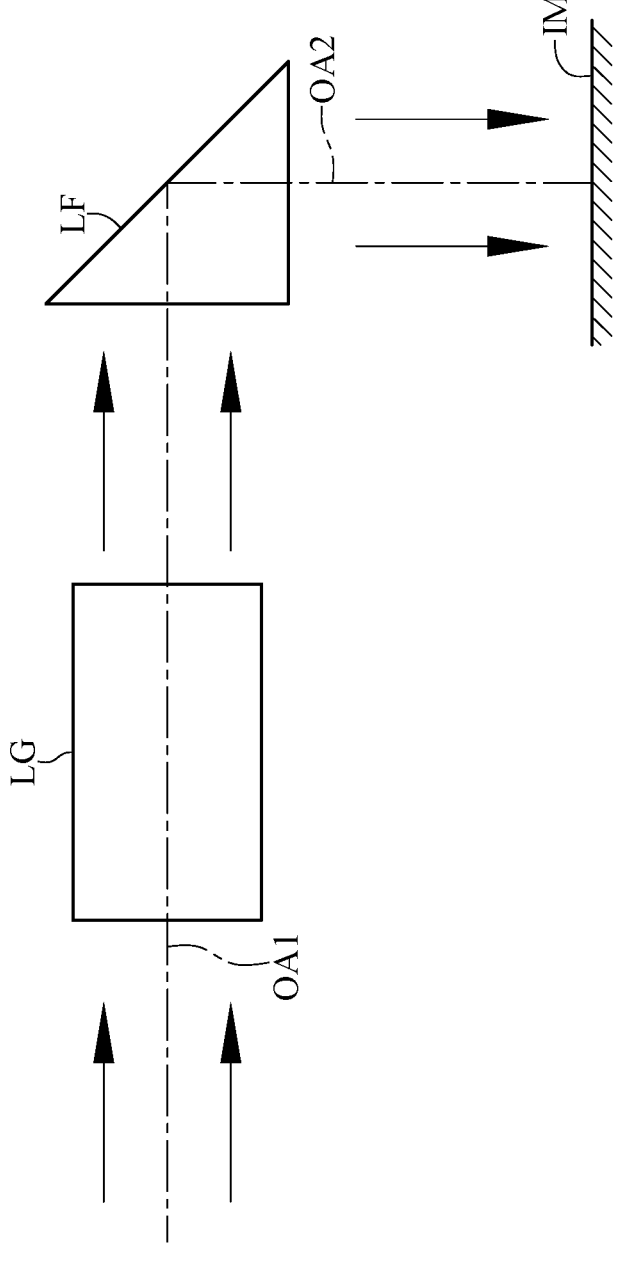
FIG. 32 shows a schematic view of another configuration of a light-folding element in an optical lens system according to one embodiment of the present disclosure.
Figure 33:
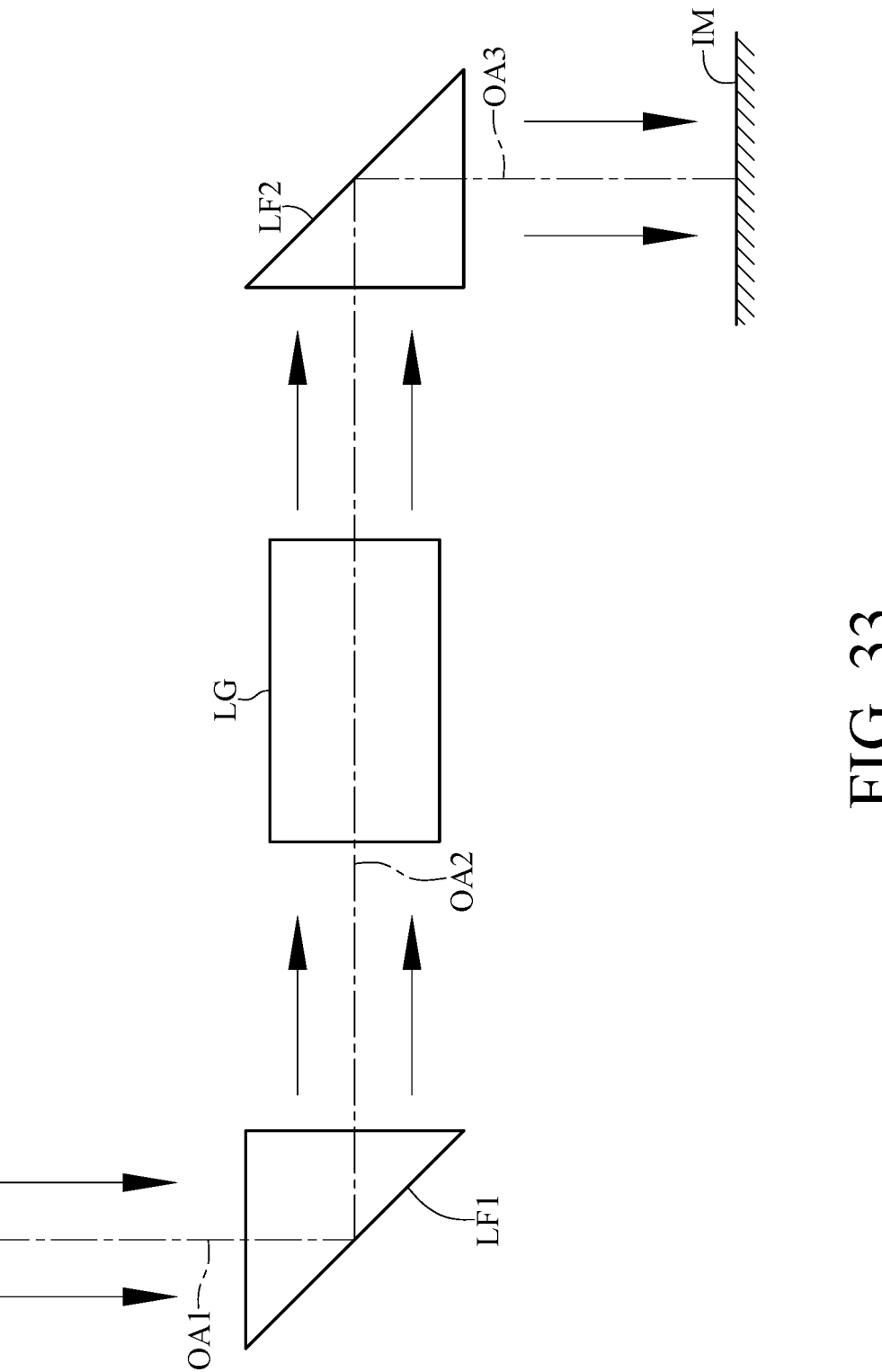
FIG. 33 shows a schematic view of a configuration of two light-folding elements in an optical lens system according to one embodiment of the present disclosure.

According to the present disclosure, at least one light-folding element, such as a prism or a mirror, can be optionally disposed between an imaged object and the image surface on the imaging optical path, such that the optical lens system can be more flexible in space arrangement, and therefore the dimensions of an electronic device is not restricted by the total track length of the optical lens system. Specifically, please refer to FIG. 31 and FIG. 32. FIG. 31 shows a schematic view of a configuration of a light-folding element in an optical lens system according to one embodiment of the present disclosure, and FIG. 32 shows a schematic view of another configuration of a light-folding element in an optical lens system according to one embodiment of the present disclosure. In FIG. 31 and FIG. 32, the optical lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical lens system as shown in FIG. 31 or disposed between a lens group LG of the optical lens system and the image surface IM as shown in FIG. 32. Furthermore, please refer to FIG. 33, which shows a schematic view of a configuration of two light-folding elements in an optical lens system according to one embodiment of the present disclosure. In FIG. 33, the optical lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical lens system, the second light-folding element LF2 is disposed between the lens group LG of the optical lens system and the image surface IM, and the travelling direction of light on the first optical axis OA1 can be the same direction as the travelling direction of light on the third optical axis OA3 as shown in FIG. 33. The optical lens system can be optionally provided with three or more light-folding elements, and the present disclosure is not limited to the type, amount and position of the light-folding elements of the embodiments disclosed in the aforementioned figures.

According to the present disclosure, the optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical lens system and thereby provides a wider field of view for the same.

According to the present disclosure, the optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
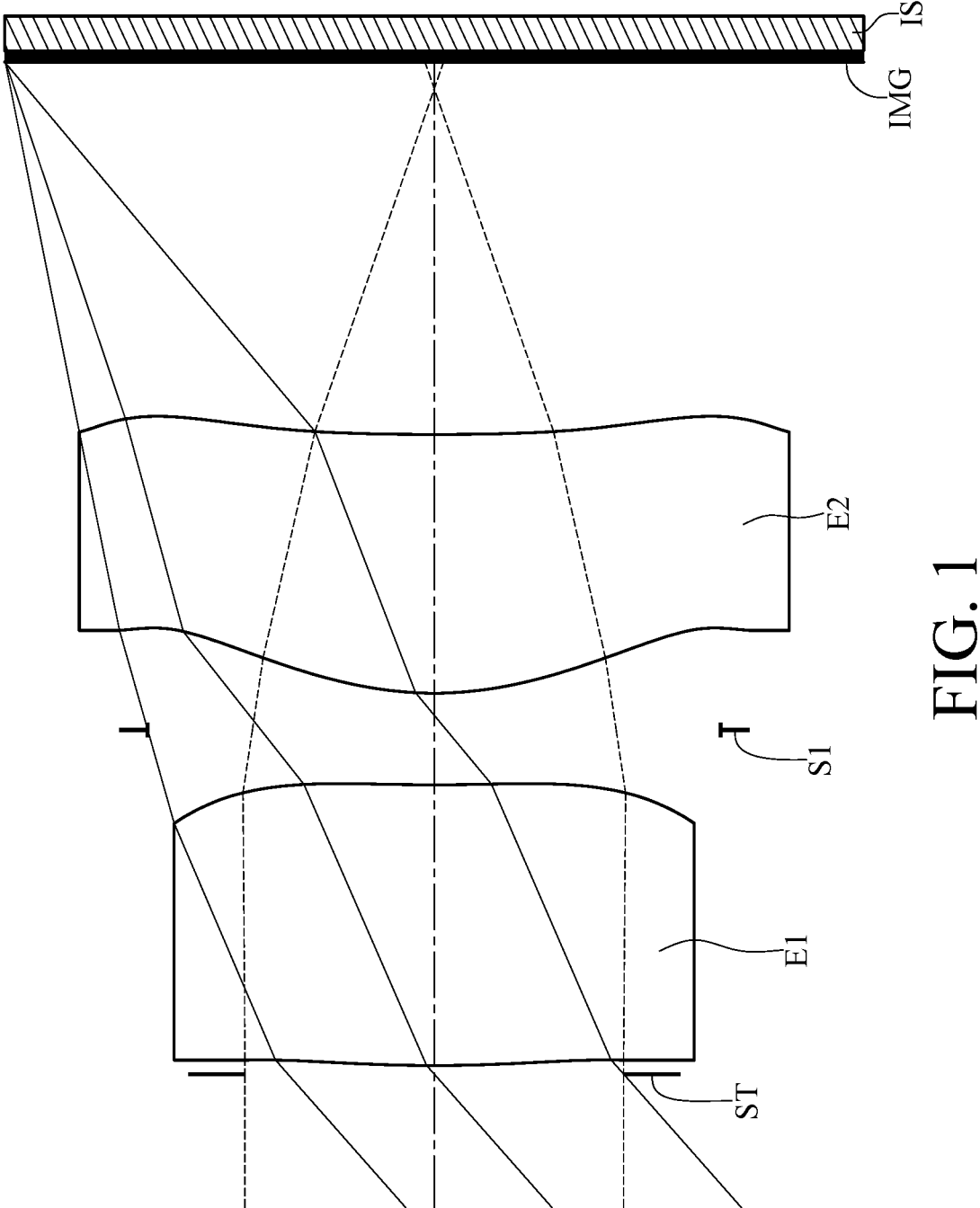
FIG. 1 is a schematic view of a receiver of a time of flight sensing module according to the 1st embodiment of the present disclosure.
Figure 2:
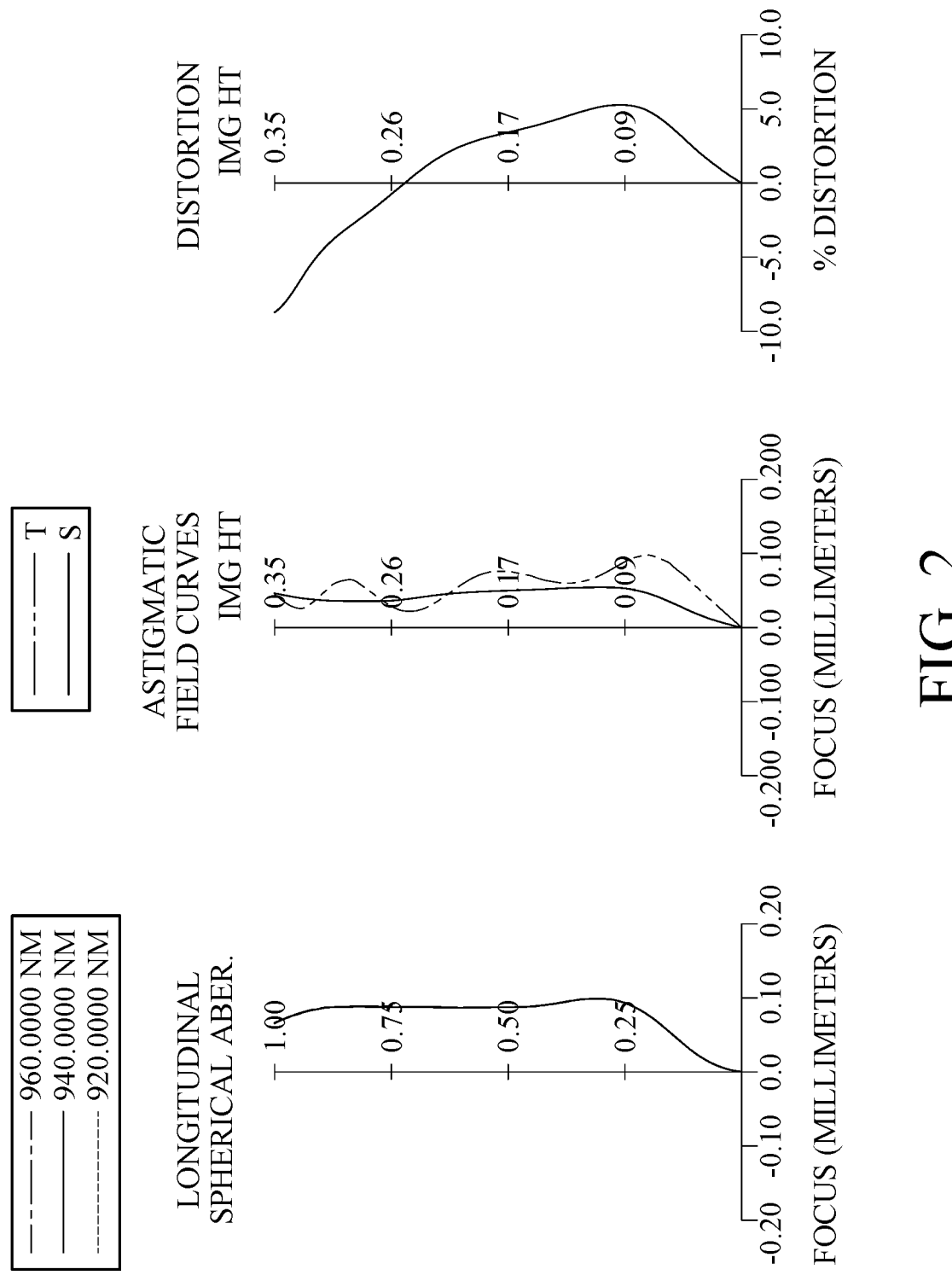
FIG. 2 shows spherical aberration curves, astigmatic field curves and a distortion curve of the receiver of the time of flight sensing module according to the 1st embodiment.

FIG. 1 is a schematic view of a receiver of a time of flight sensing module according to the 1st embodiment of the present disclosure. FIG. 2 shows, in order from left to right, spherical aberration curves, astigmatic field curves and a distortion curve of the receiver of the time of flight sensing module according to the 1st embodiment. In FIG. 1, the receiver 1 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points.

The image sensor IS is disposed on or near the image surface IMG of the optical lens system.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical lens system of the receiver 1 of the time of flight sensing module according to the 1st embodiment, when a focal length of the optical lens system is f, an f-number of the optical lens system is Fno, and half of a maximum field of view of the optical lens system is HFOV, these parameters have the following values: f=0.40 millimeters (mm), Fno=1.30, HFOV=41.4 degrees (deg.).

When an Abbe number of the second lens element E2 is V2, the following condition is satisfied: V2=18.384.

When an Abbe number of the first lens element E1 is V1, the Abbe number of the second lens element E2 is V2, an Abbe number of the i-th lens element (one lens element) is Vi, and a sum of Abbe numbers of all lens elements of the optical lens system is $\Sigma Vi$, the following condition is satisfied: $\Sigma Vi$=37.8, wherein i=1 and 2. In this embodiment, $\Sigma Vi$ is a sum of the Abbe number (V1) of the first lens element E1 and the Abbe number (V2) of the second lens element E2.

When the Abbe number of the first lens element E1 is V1, the Abbe number of the second lens element E2 is V2, the Abbe number of the i-th lens element (one lens element) is Vi, a refractive index of the first lens element E1 is N1, a refractive index of the second lens element E2 is N2, a refractive index of the i-th lens element (the one lens element) is Ni, and a minimum value of Vi/Ni is (Vi/Ni)min, the following conditions are satisfied: V1/N1=11.9; V2/N2=11.1; and (Vi/Ni)min=11.1. In this embodiment, among the first and second lens elements (E1, E2), the value of Vi/Ni of the second lens element E2 is smaller than the value of Vi/Ni of the other lens element, and (Vi/Ni)min is equal to the value of Vi/Ni of the second lens element E2 (i.e., V2/N2).

When a maximum value among refractive indices of all lens elements of the optical lens system is Nmax, the following condition is satisfied: Nmax=1.656. In this embodiment, among the first and second lens elements (E1, E2), the refractive index of the second lens element E2 is larger than the refractive index of the other lens element, and Nmax is equal to the refractive index of the second lens element (i.e., N2).

When an axial distance between the first lens element E1 and the second lens element E2 is T12, and a central thickness of the first lens element E1 is CT1, the following condition is satisfied: T12/CT1=0.33. In this embodiment, an axial distance between two adjacent lens elements is a distance in a paraxial region between two adjacent lens surfaces of the two adjacent lens elements.

When a focal length of the first lens element E1 is f1, and a focal length of the second lens element E2 is f2, the following condition is satisfied: f1/f2=5.88.

When the focal length of the optical lens system is f, and an entrance pupil diameter of the optical lens system is EPD, the following condition is satisfied: f/EPD=1.30.

When an axial distance between a lens surface of all lens elements of the optical lens system closest to the image surface IMG (the image-side surface of the second lens element E2) and the image surface IMG is BL, and an axial distance between the object-side surface of the first lens element E1 and the image surface IMG is TL, the following condition is satisfied: BL/TL=0.37.

When the maximum field of view of the optical lens system is FOV, the following condition is satisfied: FOV=82.75 [deg.].

When an axial distance between the aperture stop ST and the lens surface of all lens elements of the optical lens system closest to the image surface IMG (the image-side surface of the second lens element E2) is SD, and an axial distance between the object-side surface of the first lens element E1 and the lens surface of all lens elements of the optical lens system closest to the image surface IMG (the image-side surface of the second lens element E2) is TD, the following condition is satisfied: SD/TD=1.01.

When the axial distance between the object-side surface of the first lens element E1 and the lens surface of all lens elements of the optical lens system closest to the image surface IMG (the image-side surface of the second lens element E2) is TD, and the entrance pupil diameter of the optical lens system is EPD, the following condition is satisfied: TD/EPD=1.67.

When the entrance pupil diameter of the optical lens system is EPD, and a maximum value among central thicknesses of all lens elements of the optical lens system is CTmax, the following condition is satisfied: EPD/CTmax=1.35. In this embodiment, among the first and second lens elements (E1, E2), the central thickness of the first lens element E1 is larger than the central thickness of the other lens element, and CTmax is equal to the central thickness of the first lens element (i.e., CT1).

When the entrance pupil diameter of the optical lens system is EPD, and the axial distance between the lens surface of all lens elements of the optical lens system closest to the image surface IMG (the image-side surface of the second lens element E2) and the image surface IMG is BL, the following condition is satisfied: EPD/BL=1.02.

When the entrance pupil diameter of the optical lens system is EPD, and a maximum value among maximum effective radii of all lens surfaces of the optical lens system is Ymax, the following condition is satisfied: EPD/Ymax=1.07.

When the entrance pupil diameter of the optical lens system is EPD, and a maximum image height of the optical lens system is ImgH, the following condition is satisfied: EPD/ImgH=0.88.

When the entrance pupil diameter of the optical lens system is EPD, and the axial distance between the first lens element E1 and the second lens element E2 is T12, the following condition is satisfied: EPD/T12=4.13.

When the axial distance between the object-side surface of the first lens element E1 and the image surface IMG is TL, and the maximum image height of the optical lens system is ImgH, the following condition is satisfied: TL/ImgH=2.34.

When the axial distance between the object-side surface of the first lens element E1 and the image surface IMG is TL, and the focal length of the optical lens system is f, the following condition is satisfied: TL/f=2.04.

When the axial distance between the object-side surface of the first lens element E1 and the image surface IMG is TL, the following condition is satisfied: TL=0.82 [mm].

When a relative illumination on an image periphery of the optical lens system is RI, the following condition is satisfied: RI=66.3%.

The detailed optical data of the 1st embodiment are shown in Table 1 and the aspheric surface data are shown in Table 2 below.

TABLE 1

1st Embodiment
f = 0.40 mm, Fno = 1.30, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.007 | | | | |
| 2 | Lens 1 | 0.9522 | (ASP) | 0.230 | Plastic | 1.641 | 19.452 | 2.49 |
| 3 | | 2.1412 | (ASP) | 0.045 | | | | |
| 4 | Stop | Plano | | 0.030 | | | | |
| 5 | Lens 2 | 0.2576 | (ASP) | 0.212 | Plastic | 1.656 | 18.384 | 0.42 |
| 6 | | 2.4509 | (ASP) | 0.305 | | | | |
| 7 | Image | Plano | | — | | | | |

Note:
Reference wavelength is 940.0 nm.
An effective radius of the stop S1 (Surface 4) is 0.234 mm.

TABLE 2

| | | Aspheric Coefficients | | |
|---|---|---|---|---|
| Surface # | 2 | 3 | 5 | 6 |
| k = | −1.63074E+01 | −5.29164E−01 | −5.65958E+01 | −4.87215E+01 |
| A4 = | −1.01553E+02 | 2.32819E+01 | 1.51216E+02 | −6.18009E−01 |
| A6 = | 4.03243E+04 | −1.33203E+04 | −1.58307E+04 | 1.05017E+03 |
| A8 = | −8.98626E+06 | 1.87725E+06 | 1.05362E+06 | −6.12261E+04 |
| A10 = | 1.16971E+09 | −1.52780E+08 | −4.57270E+07 | 1.68094E+06 |
| A12 = | −9.38414E+10 | 7.63768E+09 | 1.28958E+09 | −2.43146E+07 |
| A14 = | 4.69665E+12 | −2.37385E+11 | −2.33463E+10 | 1.22866E+08 |
| A16 = | −1.42649E+14 | 4.46386E+12 | 2.60190E+11 | 1.20494E+09 |
| A18 = | 2.39992E+15 | −4.64391E+13 | −1.61755E+12 | −1.89818E+10 |
| A20 = | −1.71006E+16 | 2.04999E+14 | 4.28106E+12 | 7.25503E+10 |

In Table 1, the curvature radius, the thickness and the focal length are shown in millimeters (mm). Surface numbers 0-7 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
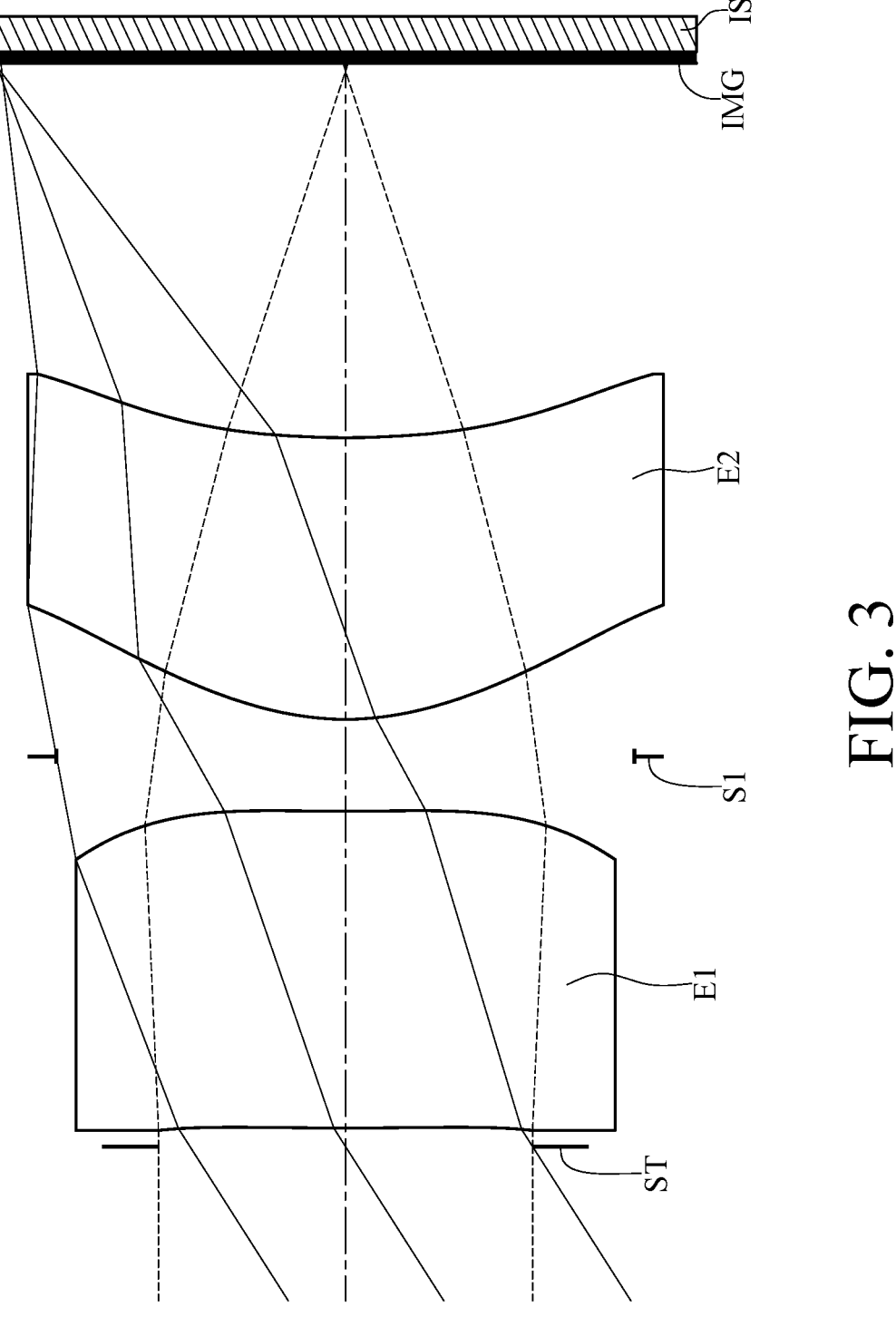
FIG. 3 is a schematic view of a receiver of a time of flight sensing module according to the 2nd embodiment of the present disclosure.
Figure 4:
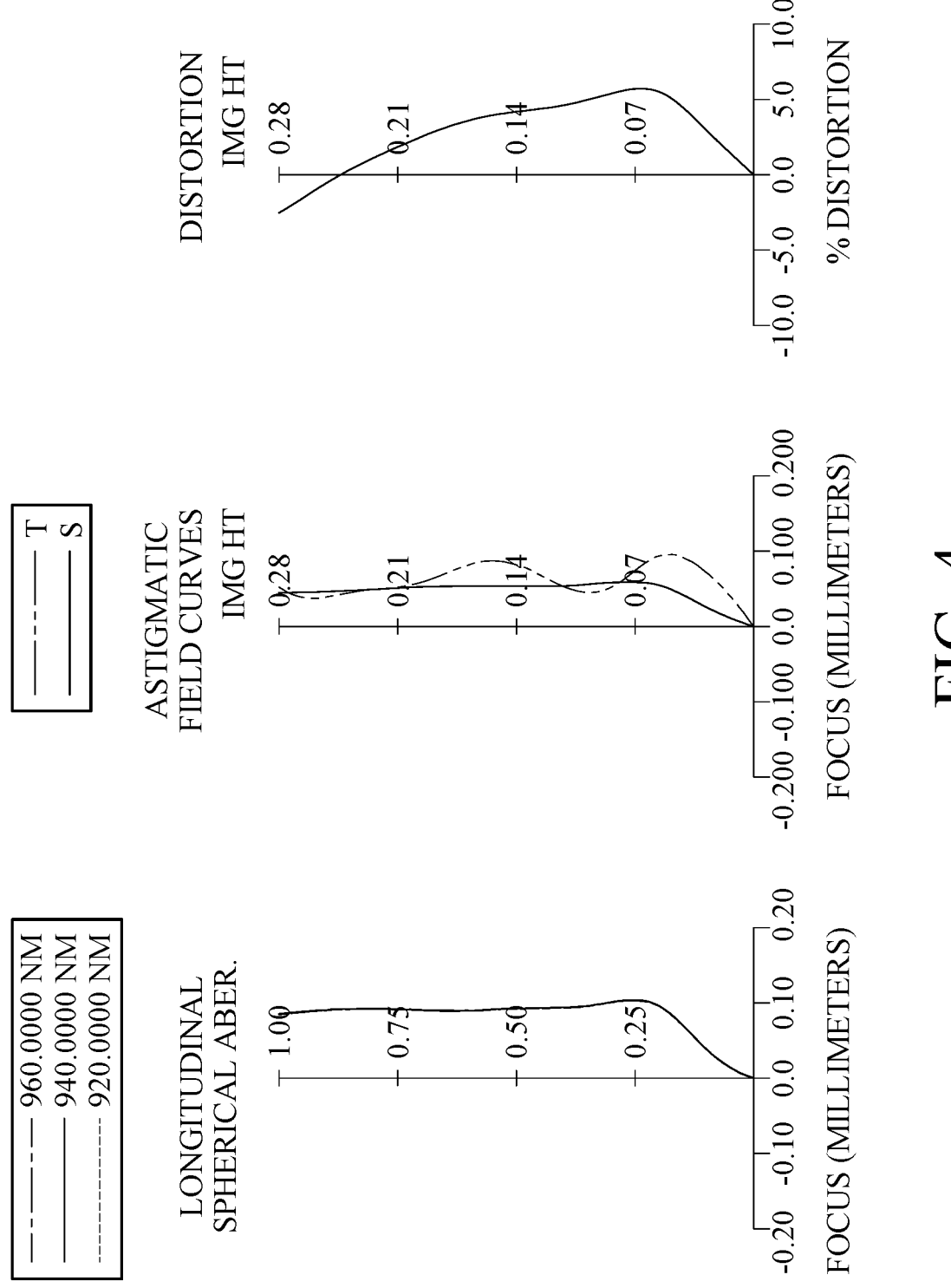
FIG. 4 shows spherical aberration curves, astigmatic field curves and a distortion curve of the receiver of the time of flight sensing module according to the 2nd embodiment.

FIG. 3 is a schematic view of a receiver of a time of flight sensing module according to the 2nd embodiment of the present disclosure. FIG. 4 shows, in order from left to right, spherical aberration curves, astigmatic field curves and a distortion curve of the receiver of the time of flight sensing module according to the 2nd embodiment. In FIG. 3, the receiver 2 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric. The object-side The image sensor IS is disposed on or near the image surface IMG of the optical lens system.

The detailed optical data of the 2nd embodiment are shown in Table 3 and the aspheric surface data are shown in Table 4 below.

TABLE 3

| | | | | | | | |
|---|---|---|---|---|---|---|---|
| 2nd Embodiment | | | | | | | |
| f = 0.40 mm, Fno = 1.33, HFOV = 32.5 deg. | | | | | | | |
| Surface # | | Curvature Radius | Thickness | Material | Index | Abbe # | Focal Length |
| 0 | Object | Plano | Infinity | | | | |
| 1 | Ape. Stop | Plano | 0.015 | | | | |
| 2 | Lens 1 | 1.8255 (ASP) | 0.257 | Plastic | 1.641 | 19.452 | −40.27 |
| 3 | | 1.6113 (ASP) | 0.044 | | | | |
| 4 | Stop | Plano | 0.030 | | | | |
| 5 | Lens 2 | 0.1994 (ASP) | 0.228 | Plastic | 1.641 | 19.452 | 0.38 |
| 6 | | 0.6278 (ASP) | 0.304 | | | | |
| 7 | Image | Plano | — | | | | |

Note:

Reference wavelength is 940.0 nm.

An effective radius of the stop S1 (Surface 4) is 0.234 mm.

TABLE 4

| | | | | |
|---|---|---|---|---|
| Aspheric Coefficients | | | | |
| Surface # | 2 | 3 | 5 | 6 |
| k = | −5.24792E+01 | −8.31370E+01 | −4.52103E+01 | −4.25168E−01 |
| A4 = | −1.49360E+02 | −8.41941E+01 | 2.34229E+02 | −8.03861E+01 |
| A6 = | 7.91072E+04 | 1.70548E+04 | −3.21926E+04 | 2.06697E+04 |
| A8 = | −2.41855E+07 | −2.88203E+06 | 3.01275E+06 | −2.61870E+06 |
| A10 = | 4.48707E+09 | 2.92474E+08 | −1.93950E+08 | 2.04885E+08 |
| A12 = | −5.37254E+11 | −1.84418E+10 | 8.71069E+09 | −1.05625E+10 |
| A14 = | 4.28263E+13 | 7.41320E+11 | −2.76524E+11 | 3.70677E+11 |
| A16 = | −2.29317E+15 | −1.90002E+13 | 6.23400E+12 | −8.99092E+12 |
| A18 = | 8.14200E+16 | 3.00298E+14 | −9.91066E+13 | 1.50656E+14 |
| A20 = | −1.83644E+18 | −2.66547E+15 | 1.08536E+15 | −1.71154E+15 |
| A22 = | 2.37974E+19 | 1.01598E+16 | −7.78730E+15 | 1.25819E+16 |
| A24 = | −1.34756E+20 | — | 3.29282E+16 | −5.39910E+16 |
| A26 = | — | — | −6.21630E+16 | 1.02690E+17 | surface of the first lens element E1 has one inflection point. The image-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f[mm] | 0.40 | FOV [deg.] | 64.98 |
| Fno | 1.33 | SD/TD | 1.03 |
| HFOV [deg.] | 32.5 | TD/EPD | 1.85 |
| V2 | 19.452 | EPD/CTmax | 1.18 |
| ΣVi | 38.9 | EPD/BL | 1.00 |
| V1/N1 | 11.9 | EPD/Ymax | 1.18 |
| V2/N2 | 11.9 | EPD/ImgH | 1.07 |
| (Vi/Ni)min | 11.9 | EPD/T12 | 4.07 |
| Nmax | 1.641 | TL/ImgH | 3.05 |
| T12/CT1 | 0.29 | TL/f | 2.14 |
| f1/f2 | −106.81 | TL [mm] | 0.86 |
| f/EPD | 1.33 | RI [%] | 71.4 |
| BL/TL | 0.35 | — | — |

3rd Embodiment

Figure 5:
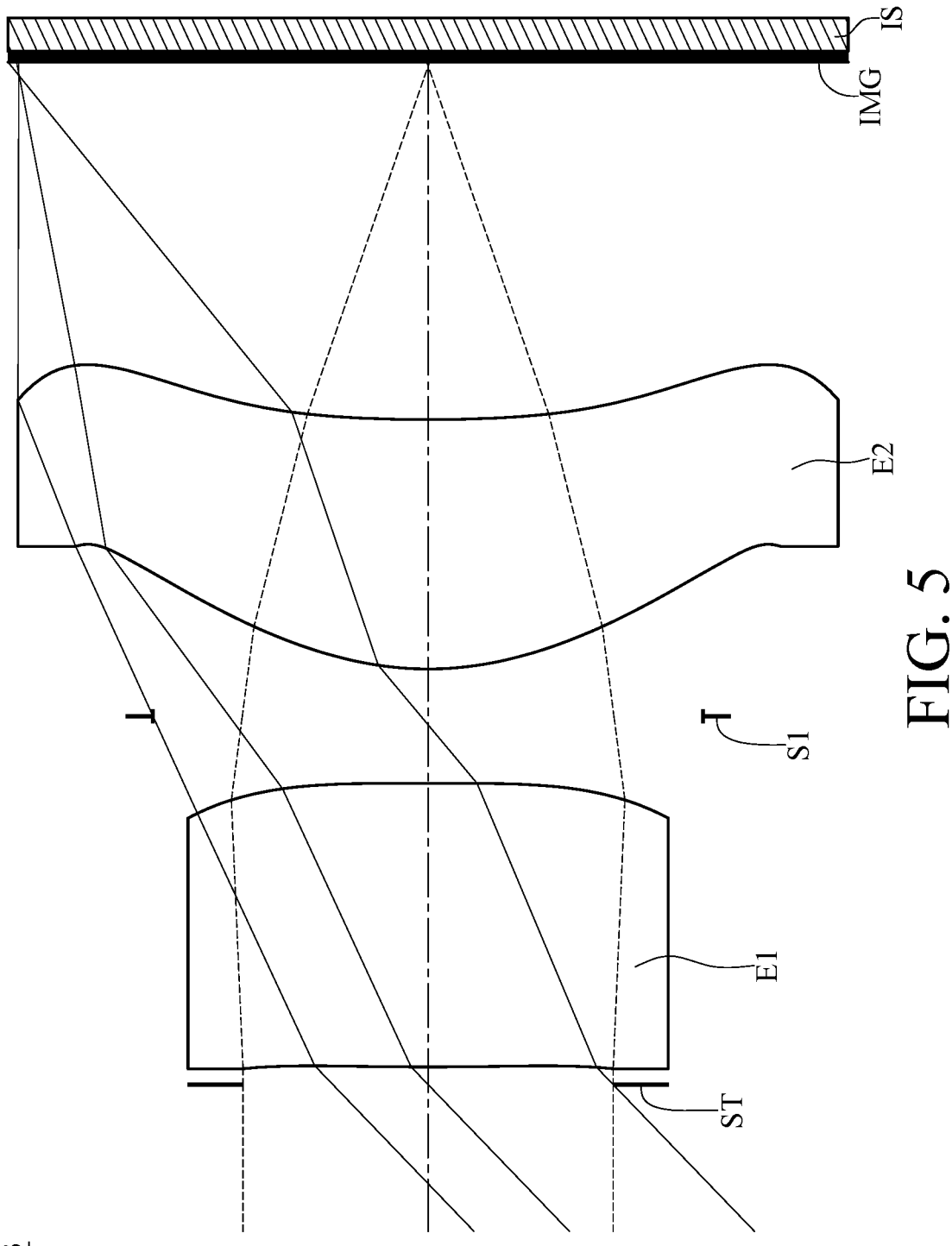
FIG. 5 is a schematic view of a receiver of a time of flight sensing module according to the 3rd embodiment of the present disclosure.
Figure 6:
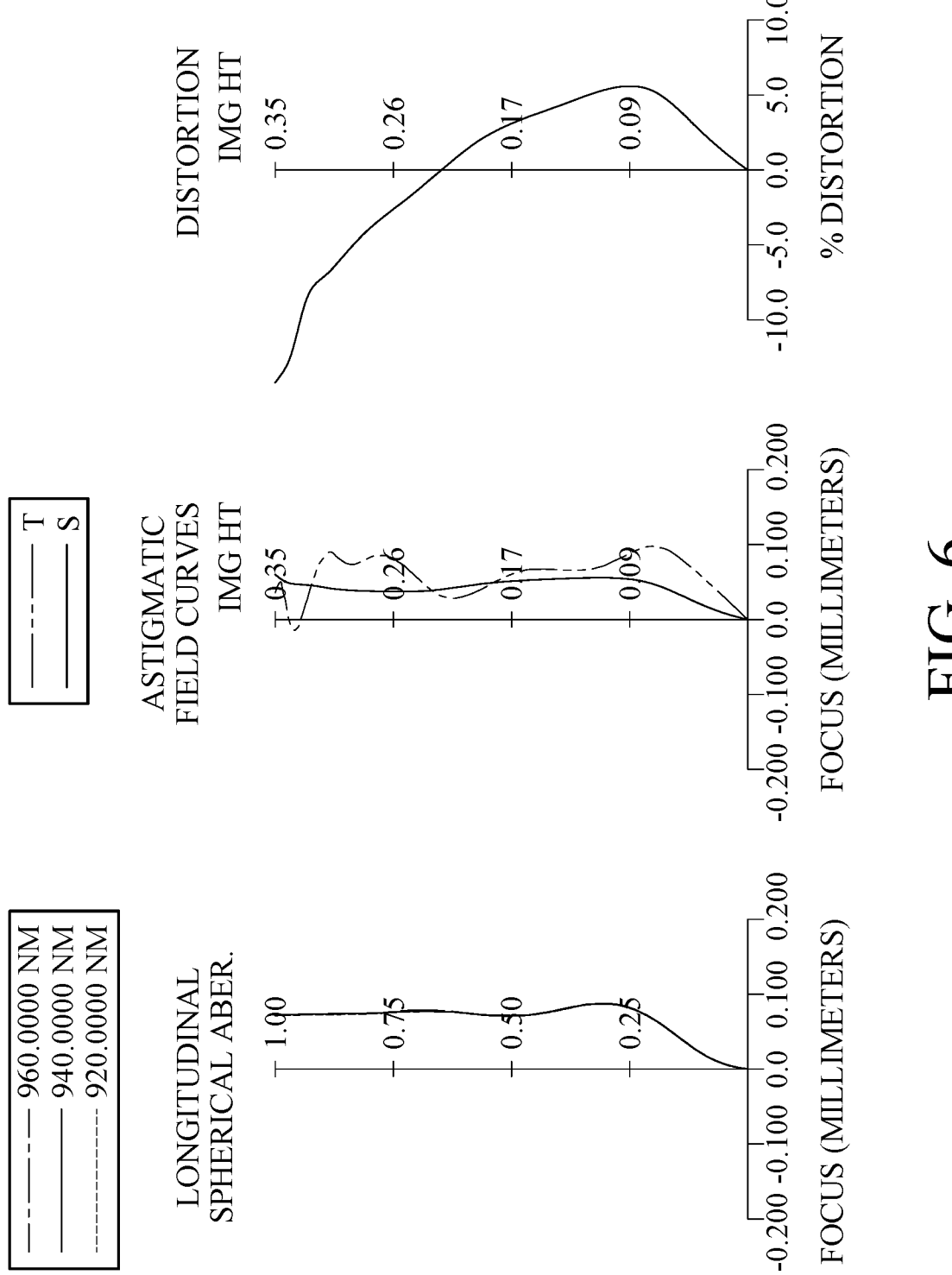
FIG. 6 shows spherical aberration curves, astigmatic field curves and a distortion curve of the receiver of the time of flight sensing module according to the 3rd embodiment.

FIG. 5 is a schematic view of a receiver of a time of flight sensing module according to the 3rd embodiment of the present disclosure. FIG. 6 shows, in order from left to right, spherical aberration curves, astigmatic field curves and a distortion curve of the receiver of the time of flight sensing module according to the 3rd embodiment. In FIG. 5, the receiver 3 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The image sensor IS is disposed on or near the image surface IMG of the optical lens system.

The detailed optical data of the 3rd embodiment are shown in Table 5 and the aspheric surface data are shown in Table 6 below.

TABLE 5

3rd Embodiment
f = 0.41 mm, Fno = 1.30, HFOV = 43.9 deg.

| Sur-face # | | Curvature Radius | Thick-ness | Ma-te-rial | Index | Abbe # | Focal Length |
|---|---|---|---|---|---|---|---|
| 0 | Ob-ject | Plano | Infinity | | | | |
| 1 | Ape. Stop | Plano | 0.015 | | | | |
| 2 | Lens 1 | 2.0701 (ASP) | 0.242 | Plas-tic | 1.641 | 19.452 | 2.35 |
| 3 | | −5.2815 (ASP) | 0.057 | | | | |
| 4 | Stop | Plano | 0.040 | | | | |
| 5 | Lens 2 | 0.2524 (ASP) | 0.212 | Plas-tic | 1.630 | 21.259 | 0.46 |
| 6 | | 1.3424 (ASP) | 0.305 | | | | |
| 7 | Image | Plano | — | | | | |

Note:

Reference wavelength is 940.0 nm.

An effective radius of the stop S1 (Surface 4) is 0.234 mm.

TABLE 6

Aspheric Coefficients

| Surface # | 2 | 3 | 5 | 6 |
|---|---|---|---|---|
| k = | −1.35126E+01 | 3.55104E+01 | −4.12262E+01 | −2.37992E+01 |
| A4 = | −6.61628E+01 | 3.73836E+01 | 1.40313E+02 | 6.27436E+00 |
| A6 = | 2.15560E+04 | −1.59958E+04 | −1.32216E+04 | 3.75556E+02 |
| A8 = | −4.11090E+06 | 2.26371E+06 | 8.47472E+05 | −1.91035E+04 |
| A10 = | 4.54577E+08 | −1.82387E+08 | −3.66054E+07 | 3.46320E+05 |
| A12 = | −3.09924E+10 | 8.91697E+09 | 1.07213E+09 | 1.39767E+06 |
| A14 = | 1.32173E+12 | −2.68653E+11 | −2.13865E+10 | −2.10051E+08 |
| A16 = | −3.43270E+13 | 4.86756E+12 | 2.88588E+11 | 4.74839E+09 |
| A18 = | 4.95599E+14 | −4.85945E+13 | −2.57425E+12 | −5.57449E+10 |
| A20 = | −3.03949E+15 | 2.05292E+14 | 1.44459E+13 | 3.73982E+11 |
| A22 = | — | — | −4.59532E+13 | −1.35889E+12 |
| A24 = | — | — | 6.30136E+13 | 2.08016E+12 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f[mm] | 0.41 | FOV [deg.] | 87.73 |
| Fno | 1.30 | SD/TD | 1.03 |
| HFOV [deg.] | 43.9 | TD/EPD | 1.75 |
| V2 | 21.259 | EPD/CTmax | 1.30 |
| ΣVi | 40.7 | EPD/BL | 1.03 |
| V1/N1 | 11.9 | EPD/Ymax | 0.90 |
| V2/N2 | 13.0 | EPD/ImgH | 0.90 |
| (Vi/Ni)min | 11.9 | EPD/T12 | 3.24 |
| Nmax | 1.641 | TL/ImgH | 2.45 |
| T12/CT1 | 0.40 | TL/f | 2.09 |
| f1/f2 | 5.12 | TL [mm] | 0.86 |
| f/EPD | 1.30 | RI [%] | 90.1 |
| BL/TL | 0.36 | — | — |

4th Embodiment

Figure 7:
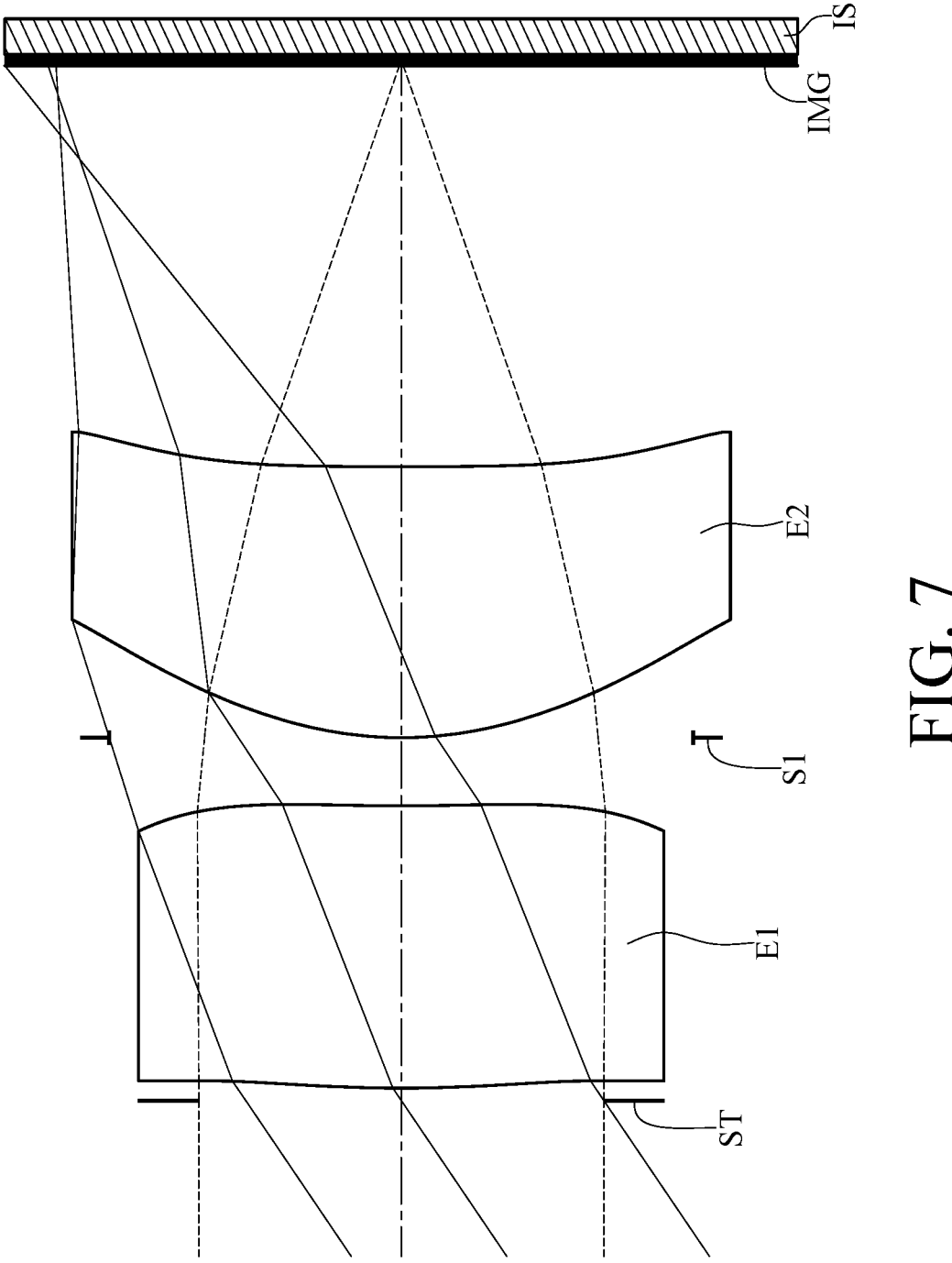
FIG. 7 is a schematic view of a receiver of a time of flight sensing module according to the 4th embodiment of the present disclosure.
Figure 8:
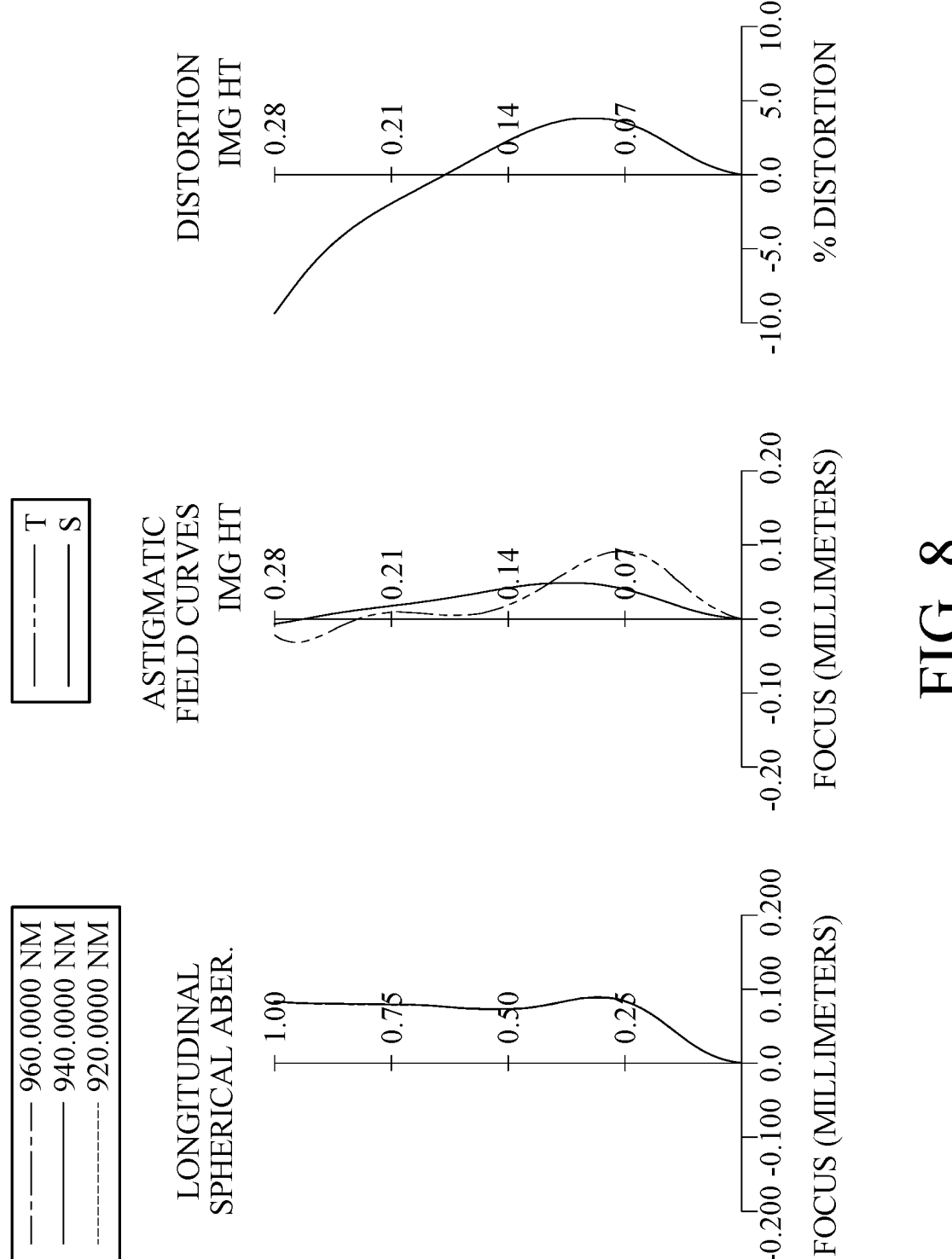
FIG. 8 shows spherical aberration curves, astigmatic field curves and a distortion curve of the receiver of the time of flight sensing module according to the 4th embodiment.

FIG. 7 is a schematic view of a receiver of a time of flight sensing module according to the 4th embodiment of the present disclosure. FIG. 8 shows, in order from left to right, spherical aberration curves, astigmatic field curves and a distortion curve of the receiver of the time of flight sensing module according to the 4th embodiment. In FIG. 7, the receiver 4 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a The image sensor IS is disposed on or near the image surface IMG of the optical lens system.

The detailed optical data of the 4th embodiment are shown in Table 7 and the aspheric surface data are shown in Table 8 below.

TABLE 7

| 4th Embodiment f = 0.42 mm, Fno = 1.30, HFOV = 34.1 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | 0.010 | | | | |
| 2 | Lens 1 | 0.9532 (ASP) | 0.226 | Plastic | 1.535 | 55.983 | 2.75 |
| 3 | | 2.4861 (ASP) | 0.055 | | | | |
| 4 | Stop | Plano | 0.000 | | | | |
| 5 | Lens 2 | 0.2759 (ASP) | 0.217 | Plastic | 1.634 | 20.400 | 0.45 |
| 6 | | 6.4835 (ASP) | 0.321 | | | | |
| 7 | Image | Plano | — | | | | |

Note:

Reference wavelength is 940.0 nm.

An effective radius of the stop S1 (Surface 4) is 0.234 mm.

TABLE 8

| Aspheric Coefficients | | | | |
|---|---|---|---|---|
| Surface # | 2 | 3 | 5 | 6 |
| k = | −4.96968E+00 | −4.02686E+01 | −5.57758E+01 | 9.00000E+01 |
| A4 = | −6.88011E+01 | 4.05185E+01 | 1.30895E+02 | −1.13748E+00 |
| A6 = | 2.18855E+04 | −1.61208E+04 | −1.11692E+04 | 1.01487E+03 |
| A8 = | −4.11171E+06 | 2.26579E+06 | 6.19332E+05 | −5.24712E+04 |
| A10 = | 4.53976E+08 | −1.82429E+08 | −2.21441E+07 | 1.52853E+06 |
| A12 = | −3.09949E+10 | 8.91724E+09 | 5.13135E+08 | −2.77892E+07 |
| A14 = | 1.32263E+12 | −2.68635E+11 | −7.64478E+09 | 3.14588E+08 |
| A16 = | −3.43070E+13 | 4.86766E+12 | 7.04992E+10 | −2.15571E+09 |
| A18 = | 4.93950E+14 | −4.86114E+13 | −3.65385E+11 | 8.18283E+09 |
| A20 = | −3.02113E+15 | 2.05472E+14 | 8.11630E+11 | −1.32058E+10 | paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.42 | FOV [deg.] | 68.18 |
| Fno | 1.30 | SD/TD | 1.02 |

-continued

| 4th Embodiment | | | |
|---|---|---|---|
| HFOV [deg.] | 34.1 | TD/EPD | 1.54 |
| V2 | 20.400 | EPD/CTmax | 1.43 |
| ΣVi | 76.4 | EPD/BL | 1.01 |
| V1/N1 | 36.5 | EPD/Ymax | 1.23 |
| V2/N2 | 12.5 | EPD/ImgH | 1.15 |
| (Vi/Ni)min | 12.5 | EPD/T12 | 5.95 |
| Nmax | 1.634 | TL/ImgH | 2.90 |
| T12/CT1 | 0.24 | TL/f | 1.94 |
| f1/f2 | 6.13 | TL [mm] | 0.82 |
| f/EPD | 1.30 | RI [%] | 77.6 |
| BL/TL | 0.39 | — | — |

5th Embodiment

Figure 9:
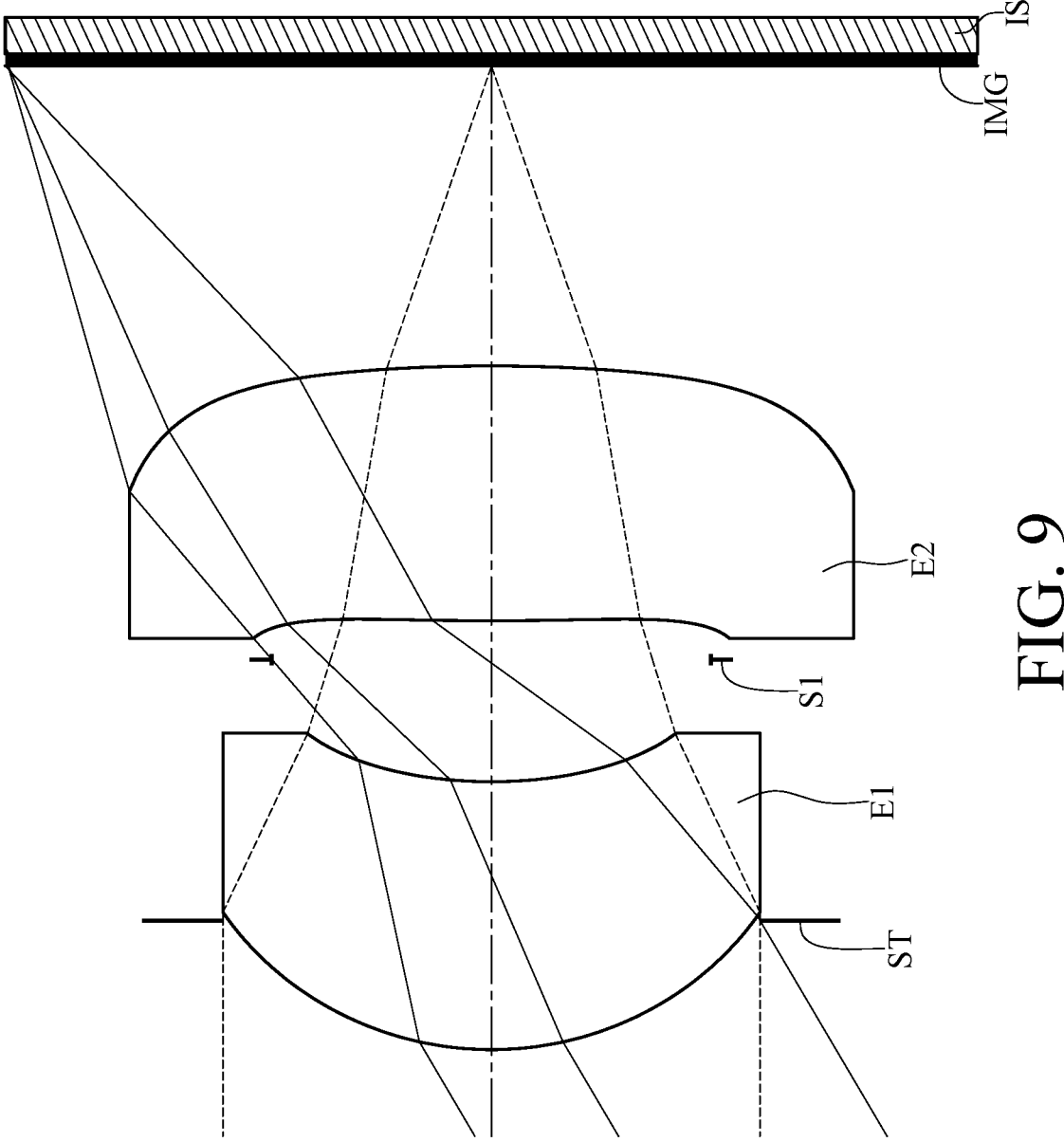
FIG. 9 is a schematic view of a receiver of a time of flight sensing module according to the 5th embodiment of the present disclosure.
Figure 10:
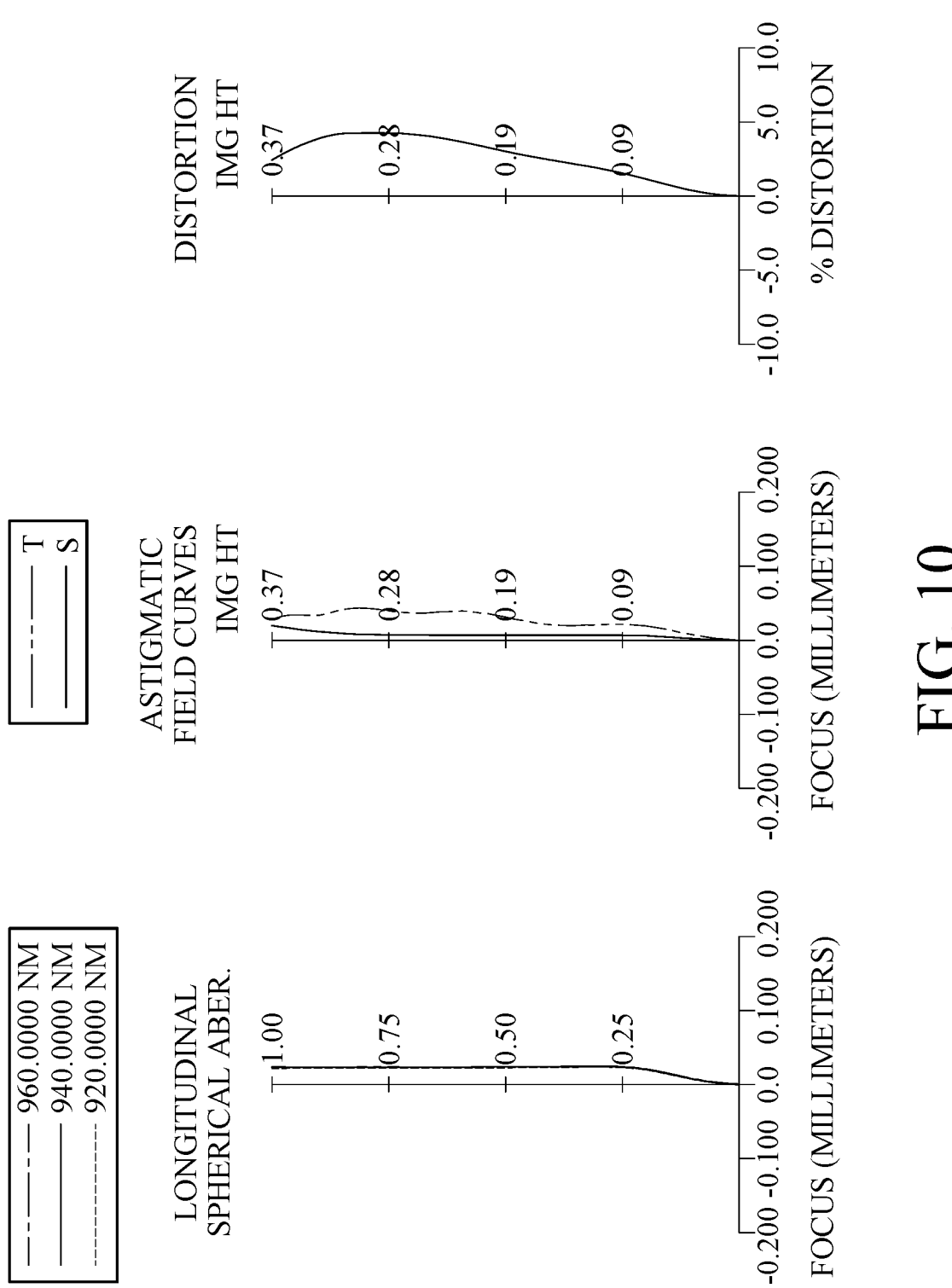
FIG. 10 shows spherical aberration curves, astigmatic field curves and a distortion curve of the receiver of the time of flight sensing module according to the 5th embodiment.

FIG. 9 is a schematic view of a receiver of a time of flight sensing module according to the 5th embodiment of the present disclosure. FIG. 10 shows, in order from left to right, spherical aberration curves, astigmatic field curves and a distortion curve of the receiver of the time of flight sensing module according to the 5th embodiment. In FIG. 9, the receiver 5 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point.

The image sensor IS is disposed on or near the image surface IMG of the optical lens system.

The detailed optical data of the 5th embodiment are shown in Table 9 and the aspheric surface data are shown in Table 10 below.

TABLE 9

| 5th Embodiment f = 0.60 mm, Fno = 1.45, HFOV = 30.5 deg. | | | | | | |
|---|---|---|---|---|---|---|
| Sur-face # | | Curvature Radius | Thick-ness | Ma-te-rial | Index | Abbe # | Focal Length |
| 0 | Ob-ject | Plano | Infinity | | | | |
| 1 | Ape. Stop | Plano | −0.100 | | | | |
| 2 | Lens 1 | 0.2590 (ASP) | 0.208 | Plas-tic | 1.641 | 19.452 | 0.77 |
| 3 | | 0.3755 (ASP) | 0.095 | | | | |

TABLE 9-continued

| 5th Embodiment f = 0.60 mm, Fno = 1.45, HFOV = 30.5 deg. | | | | | | |
|---|---|---|---|---|---|---|
| Sur-face # | | Curvature Radius | Thick-ness | Ma-te-rial | Index | Abbe # | Focal Length |
| 4 | Stop | Plano | 0.030 | | | | |
| 5 | Lens 2 | 1.9228 (ASP) | 0.197 | Plas-tic | 1.655 | 18.400 | 1.21 |
| 6 | | −1.2850 (ASP) | 0.233 | | | | |
| 7 | Image | Plano | — | | | | |

Note:
Reference wavelength is 940.0 nm.
An effective radius of the stop S1 (Surface 4) is 0.170 mm.

TABLE 10

| Aspheric Coefficients | | | | |
|---|---|---|---|---|
| Surface # | 2 | 3 | 5 | 6 |
| k= | 1.39715E+00 | −1.52259E+00 | −5.21809E+01 | −2.52039E+01 |
| A4= | 5.15938E+00 | 7.09038E+01 | −5.31128E+01 | 1.86632E+00 |
| A6= | 1.28780E+03 | −2.87711E+04 | 1.88157E+04 | −6.24199E+02 |
| A8= | −1.60422E+05 | 8.32732E+06 | −4.21743E+06 | 5.85432E+04 |
| A10= | 1.25021E+07 | −1.44816E+09 | 5.73931E+08 | −4.01487E+06 |
| A12= | −6.09499E+08 | 1.60223E+11 | −5.06221E+10 | 1.75395E+08 |
| A14= | 1.90982E+10 | −1.14968E+13 | 2.97254E+12 | −5.00558E+09 |
| A16= | −3.80944E+11 | 5.32278E+14 | −1.16899E+14 | 9.39240E+10 |
| A18= | 4.63087E+12 | −1.53094E+16 | 3.02993E+15 | −1.14123E+12 |
| A20= | −3.07810E+13 | 2.48172E+17 | −4.94165E+16 | 8.54961E+12 |
| A22= | 8.38553E+13 | −1.72632E+18 | 4.56648E+17 | −3.52438E+13 |
| A24= | — | — | −1.80852E+18 | 5.89442E+13 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.60 | FOV [deg.] | 60.99 |
| Fno | 1.45 | SD/TD | 0.81 |
| HFOV [deg.] | 30.5 | TD/EPD | 1.27 |
| V2 | 18.400 | EPD/CTmax | 2.00 |
| ΣVi | 37.9 | EPD/BL | 1.79 |
| V1/N1 | 11.9 | EPD/Ymax | 1.48 |
| V2/N2 | 11.1 | EPD/ImgH | 1.11 |
| (Vi/Ni)min | 11.1 | EPD/T12 | 3.33 |
| Nmax | 1.655 | TL/ImgH | 2.04 |
| T12/CT1 | 0.60 | TL/f | 1.26 |
| f1/f2 | 0.64 | TL [mm] | 0.76 |
| f/EPD | 1.45 | RI [%] | 53.9 |
| BL/TL | 0.31 | — | — |

6th Embodiment

Figure 11:
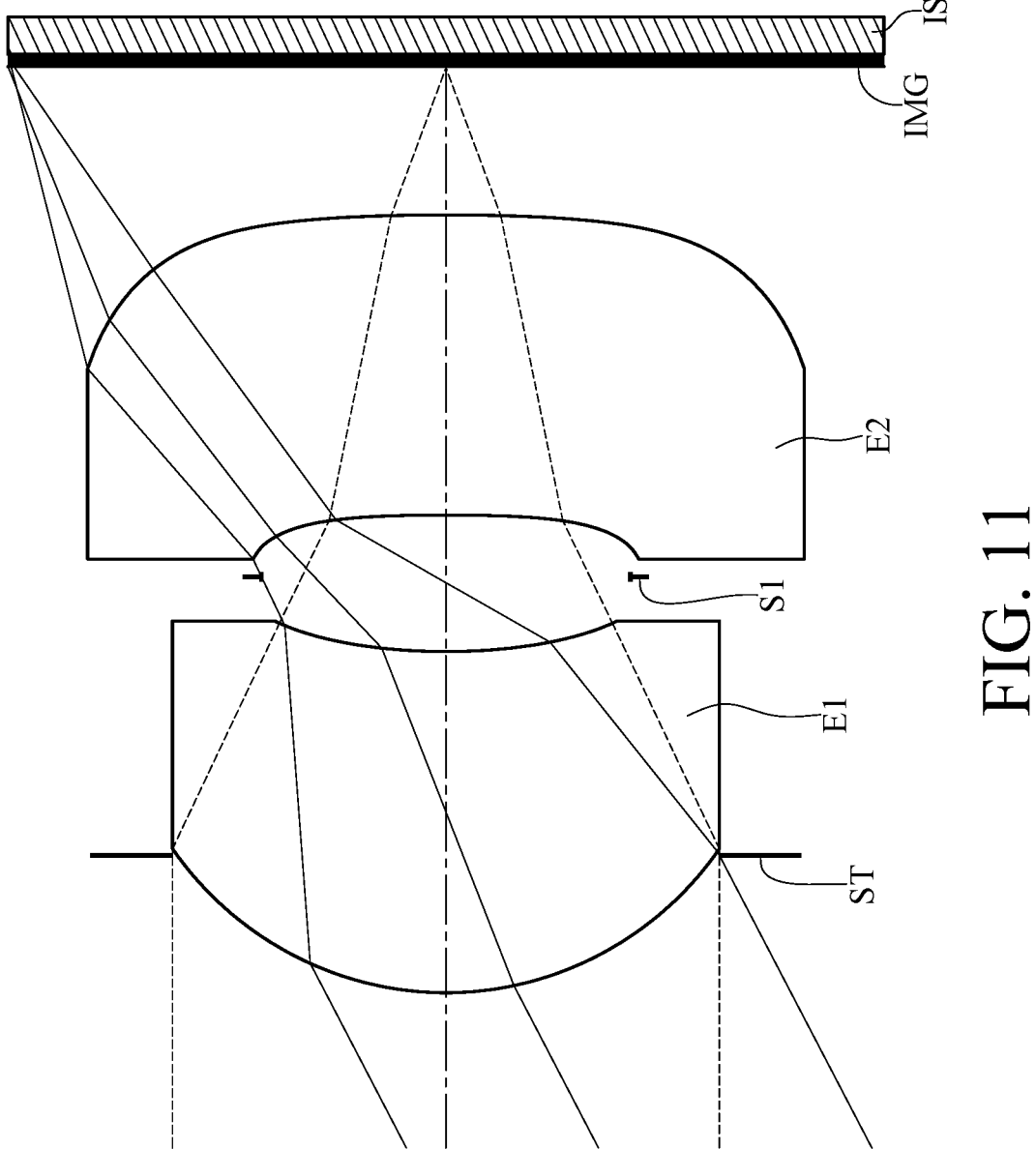
FIG. 11 is a schematic view of a receiver of a time of flight sensing module according to the 6th embodiment of the present disclosure.
Figure 12:
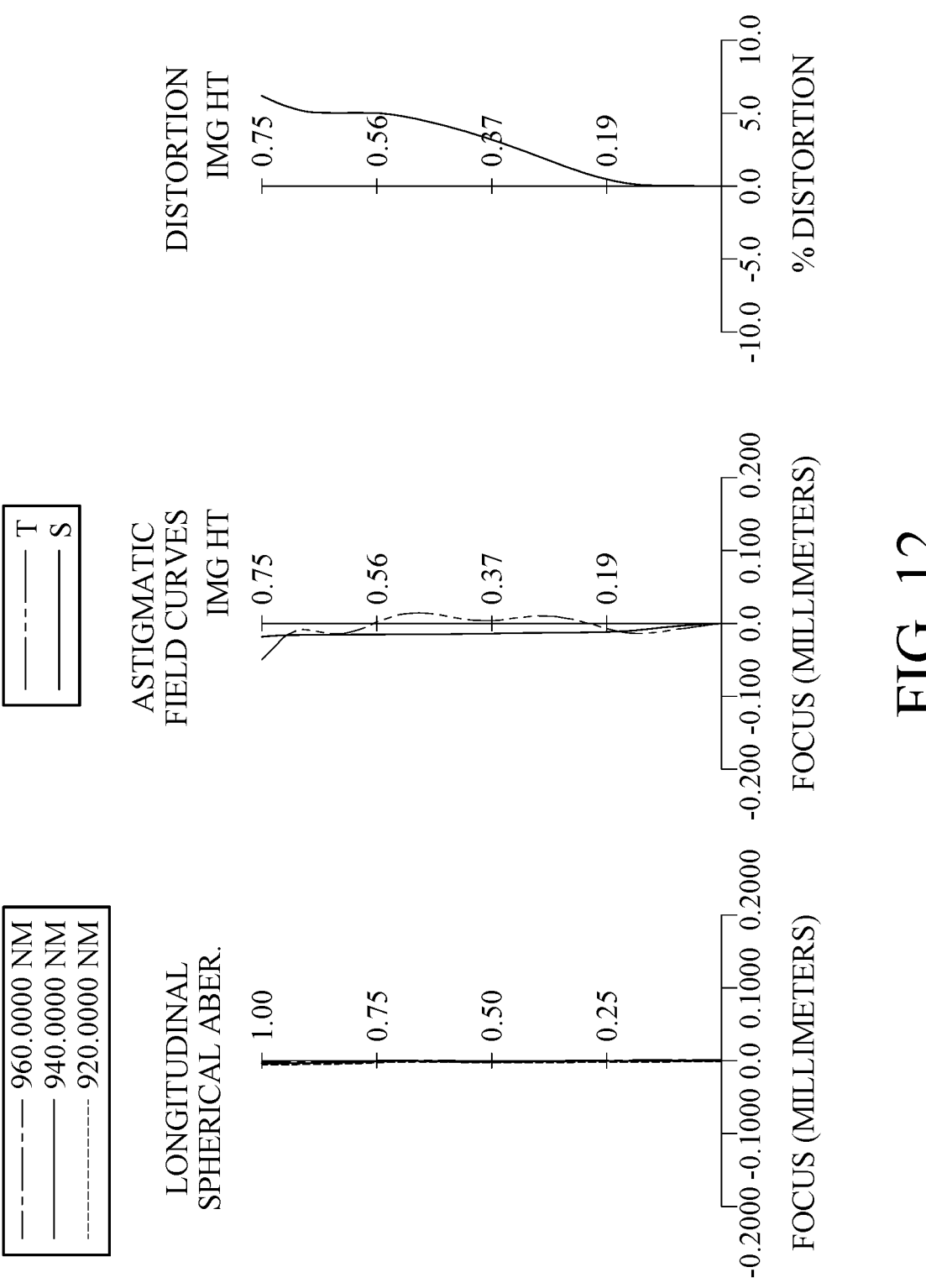
FIG. 12 shows spherical aberration curves, astigmatic field curves and a distortion curve of the receiver of the time of flight sensing module according to the 6th embodiment.

FIG. 11 is a schematic view of a receiver of a time of flight sensing module according to the 6th embodiment of the present disclosure. FIG. 12 shows, in order from left to right, spherical aberration curves, astigmatic field curves and a distortion curve of the receiver of the time of flight sensing module according to the 6th embodiment. In FIG. 11, the receiver 6 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric.

The image sensor IS is disposed on or near the image surface IMG of the optical lens system.

The detailed optical data of the 6th embodiment are shown in Table 11 and the aspheric surface data are shown in Table 12 below.

TABLE 11

6th Embodiment
f = 1.35 mm, Fno = 1.45, HFOV = 27.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.235 | | | | |
| 2 | Lens 1 | 0.5583 (ASP) | 0.583 | Plastic | 1.641 | 19.452 | 1.26 |
| 3 | | 1.0728 (ASP) | 0.128 | | | | |
| 4 | Stop | Plano | 0.106 | | | | |
| 5 | Lens 2 | −2.8866 (ASP) | 0.513 | Plastic | 1.655 | 18.400 | −44.64 |
| 6 | | −3.4282 (ASP) | 0.254 | | | | |
| 7 | Image | Plano | — | | | | |

Note:
Reference wavelength is 940.0 nm.
An effective radius of the stop S1 (Surface 4) is 0.315 mm.

TABLE 12

Aspheric Coefficients

| Surface # | 2 | 3 | 5 | 6 |
|---|---|---|---|---|
| k= | −1.99078E+00 | −9.35699E+00 | −6.70000E+01 | 9.11009E+00 |
| A4= | 1.38126E+00 | 3.69062E+00 | 3.80224E+00 | 3.49106E−01 |
| A6= | −3.02012E+00 | −1.54735E+02 | −6.38466E+02 | −2.10078E+01 |
| A8= | 9.10826E+01 | 7.05912E+03 | 3.39345E+04 | 3.03497E+02 |
| A10= | −1.23100E+03 | −1.79177E+05 | −1.07337E+06 | −2.94510E+03 |
| A12= | 9.60482E+03 | 2.65171E+06 | 2.07423E+07 | 1.74282E+04 |
| A14= | −4.18570E+04 | −2.23561E+07 | −2.46772E+08 | −6.31150E+04 |
| A16= | 9.59338E+04 | 9.82159E+07 | 1.74626E+09 | 1.35236E+05 |
| A18= | −8.84676E+04 | −1.68629E+08 | −6.64911E+09 | −1.55560E+05 |
| A20= | — | — | 1.02061E+10 | 7.22252E+04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.35 | FOV [deg.] | 55.01 |
| Fno | 1.45 | SD/TD | 0.82 |
| HFOV [deg.] | 27.5 | TD/EPD | 1.42 |
| V2 | 18.400 | EPD/CTmax | 1.60 |
| ΣVi | 37.9 | EPD/BL | 3.68 |
| V1/N1 | 11.9 | EPD/Ymax | 1.53 |
| V2/N2 | 11.1 | EPD/ImgH | 1.25 |
| (Vi/Ni)min | 11.1 | EPD/T12 | 4.00 |
| Nmax | 1.655 | TL/ImgH | 2.12 |
| T12/CT1 | 0.40 | TL/f | 1.17 |
| f1/f2 | −0.03 | TL [mm] | 1.58 |
| f/EPD | 1.45 | RI [%] | 38.1 |
| BL/TL | 0.16 | — | — |

7th Embodiment

Figure 13:
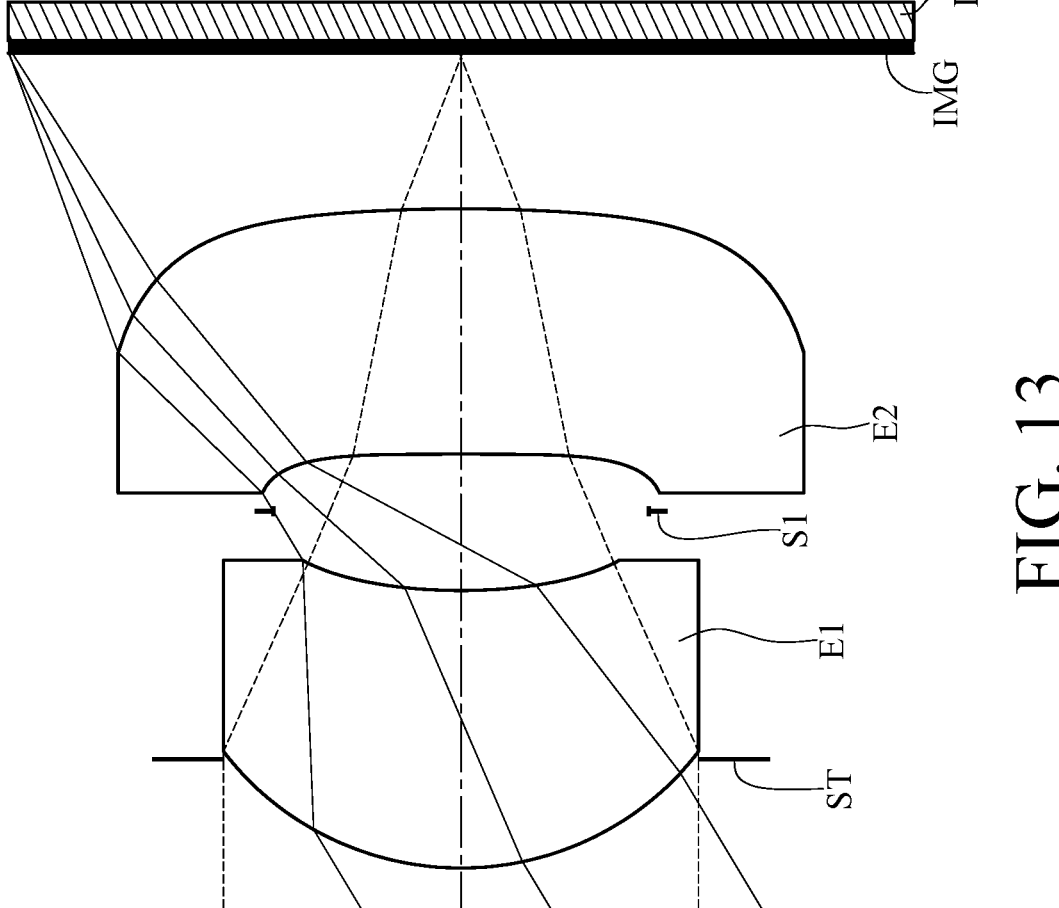
FIG. 13 is a schematic view of a receiver of a time of flight sensing module according to the 7th embodiment of the present disclosure.
Figure 14:
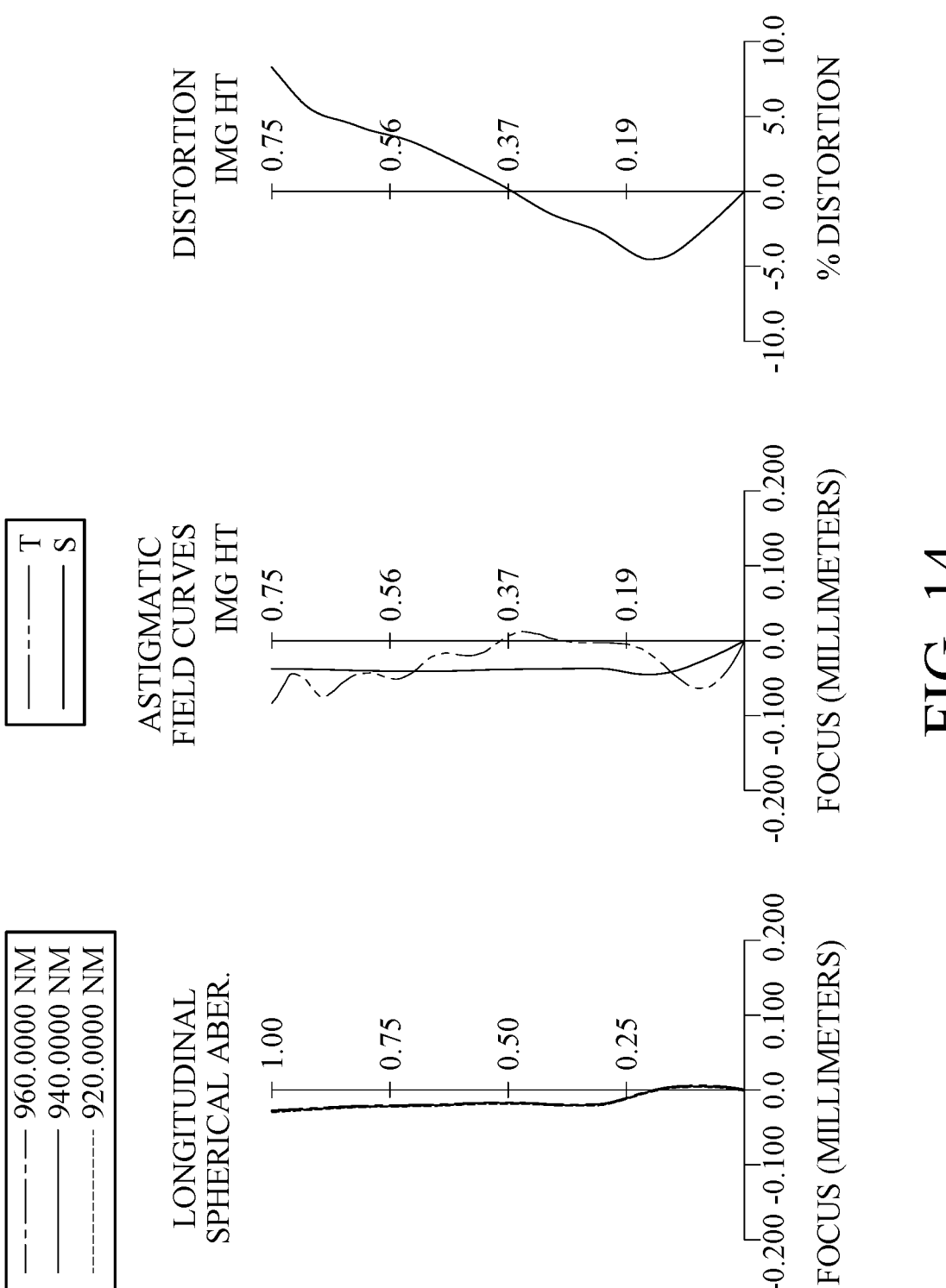
FIG. 14 shows spherical aberration curves, astigmatic field curves and a distortion curve of the receiver of the time of flight sensing module according to the 7th embodiment.

FIG. 13 is a schematic view of a receiver of a time of flight sensing module according to the 7th embodiment of the present disclosure. FIG. 14 shows, in order from left to right, spherical aberration curves, astigmatic field curves and a distortion curve of the receiver of the time of flight sensing module according to the 7th embodiment. In FIG. 13, the receiver 7 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points.

The image sensor IS is disposed on or near the image surface IMG of the optical lens system.

The detailed optical data of the 7th embodiment are shown in Table 13 and the aspheric surface data are shown in Table 14 below.

TABLE 13

| Sur-face # | | Curvature Radius | Thick-ness | Ma-te-rial | Index | Abbe # | Focal Length |
|---|---|---|---|---|---|---|---|
| 0 | Object | Plano | Infinity | | | | |
| 1 | Ape. Stop | Plano | −0.180 | | | | |
| 2 | Lens 1 | 0.4936 (ASP) | 0.459 | Plas-tic | 1.656 | 18.384 | 1.11 |
| 3 | | 0.9677 (ASP) | 0.131 | | | | |
| 4 | Stop | Plano | 0.095 | | | | |
| 5 | Lens 2 | −3.3422 (ASP) | 0.405 | Plas-tic | 1.731 | 27.579 | −118.79 |
| 6 | | −3.6540 (ASP) | 0.258 | | | | |
| 7 | Image | Plano | — | | | | |

7th Embodiment
f = 1.17 mm, Fno = 1.49, HFOV = 31.0 deg.

Note:
Reference wavelength is 940.0 nm.
An effective radius of the stop S1 (Surface 4) is 0.310 mm.

TABLE 14

Aspheric Coefficients

| Surface # | 2 | 3 | 5 | 6 |
|---|---|---|---|---|
| k= | −1.31430E+00 | 1.55737E+00 | −8.99570E+01 | −5.39903E+00 |
| A4= | −1.53375E−01 | 1.67434E+01 | 5.70652E+01 | −4.48159E+00 |
| A6= | 1.63286E+02 | −3.73364E+03 | −1.24138E+04 | 2.02659E+02 |
| A8= | −1.00395E+04 | 5.18156E+05 | 1.47424E+06 | −4.54862E+03 |
| A10= | 3.92156E+05 | −4.52729E+07 | −1.10479E+08 | 3.41895E+04 |
| A12= | −1.02370E+07 | 2.65016E+09 | 5.56250E+09 | 5.68901E+05 |
| A14= | 1.85800E+08 | −1.07918E+11 | −1.95891E+11 | −1.80218E+07 |
| A16= | −2.39598E+09 | 3.12586E+12 | 4.94439E+12 | 2.31075E+08 |
| A18= | 2.21485E+10 | −6.50330E+13 | −9.05534E+13 | −1.80544E+09 |
| A20= | −1.46372E+11 | 9.69860E+14 | 1.20501E+15 | 9.38632E+09 |
| A22= | 6.80823E+11 | −1.02102E+16 | −1.15297E+16 | −3.32143E+10 |
| A24= | −2.15528E+12 | 7.33636E+16 | 7.72602E+16 | 7.91612E+10 |
| A26= | 4.35645E+12 | −3.37330E+17 | −3.44050E+17 | −1.21598E+11 |
| A28= | −4.94673E+12 | 8.71974E+17 | 9.14317E+17 | 1.08598E+11 |
| A30= | 2.28556E+12 | −9.14016E+17 | −1.09707E+18 | −4.27581E+10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

7th Embodiment

| | | | |
|---|---|---|---|
| f [mm] | 1.17 | FOV [deg.] | 61.91 |
| Fno | 1.49 | SD/TD | 0.83 |
| HFOV [deg.] | 31.0 | TD/EPD | 1.39 |
| V2 | 27.579 | EPD/CTmax | 1.71 |
| ΣVi | 46.0 | EPD/BL | 3.05 |
| V1/N1 | 11.1 | EPD/Ymax | 1.39 |
| V2/N2 | 15.9 | EPD/ImgH | 1.05 |
| (Vi/Ni)min | 11.1 | EPD/T12 | 3.48 |
| Nmax | 1.731 | TL/ImgH | 1.80 |
| T12/CT1 | 0.49 | TL/f | 1.15 |
| f1/f2 | −0.01 | TL [mm] | 1.35 |
| f/EPD | 1.49 | RI [%] | 21.3 |
| BL/TL | 0.19 | — | — |

8th Embodiment

Figure 15:
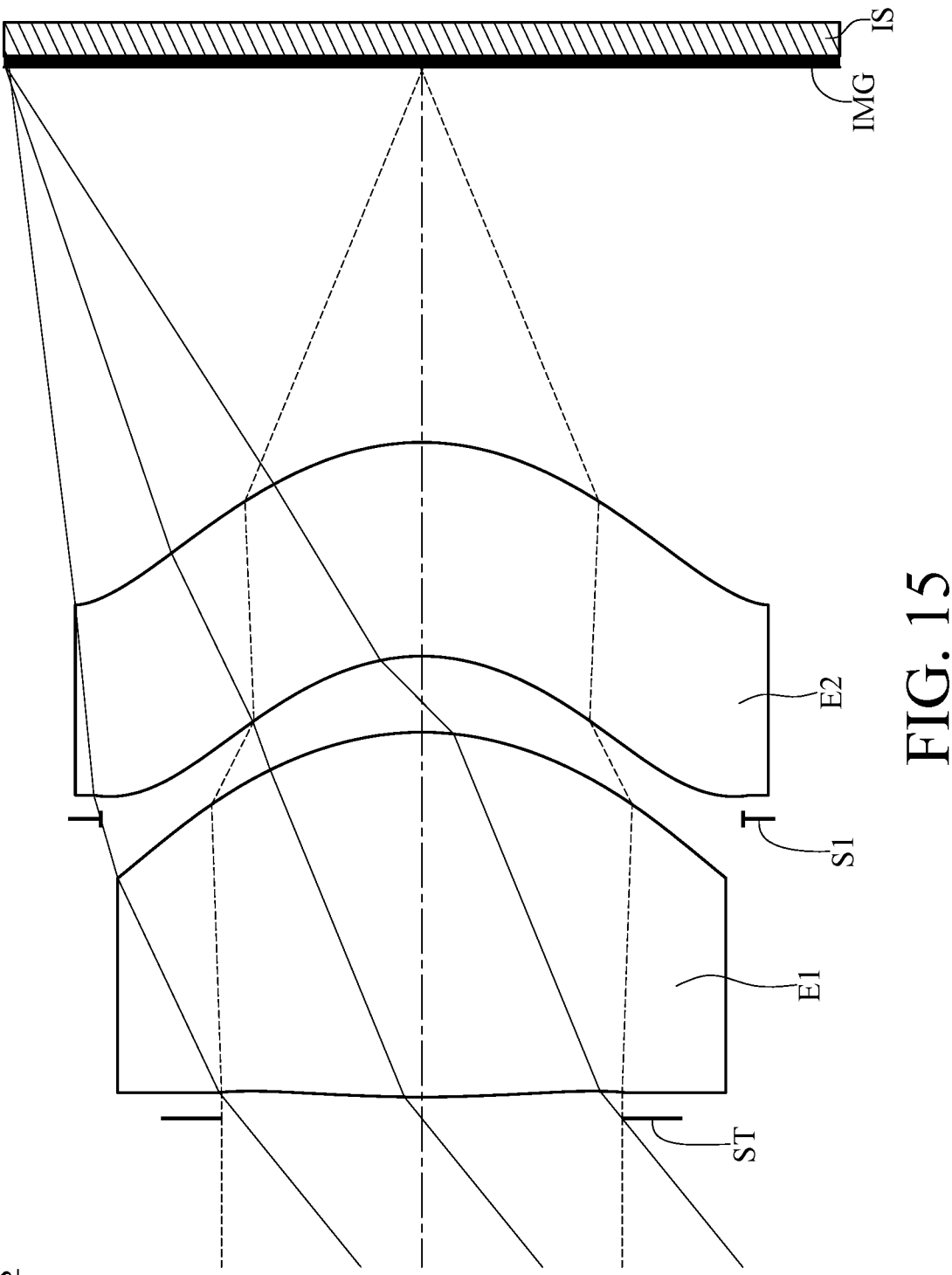
FIG. 15 is a schematic view of a receiver of a time of flight sensing module according to the 8th embodiment of the present disclosure.
Figure 16:
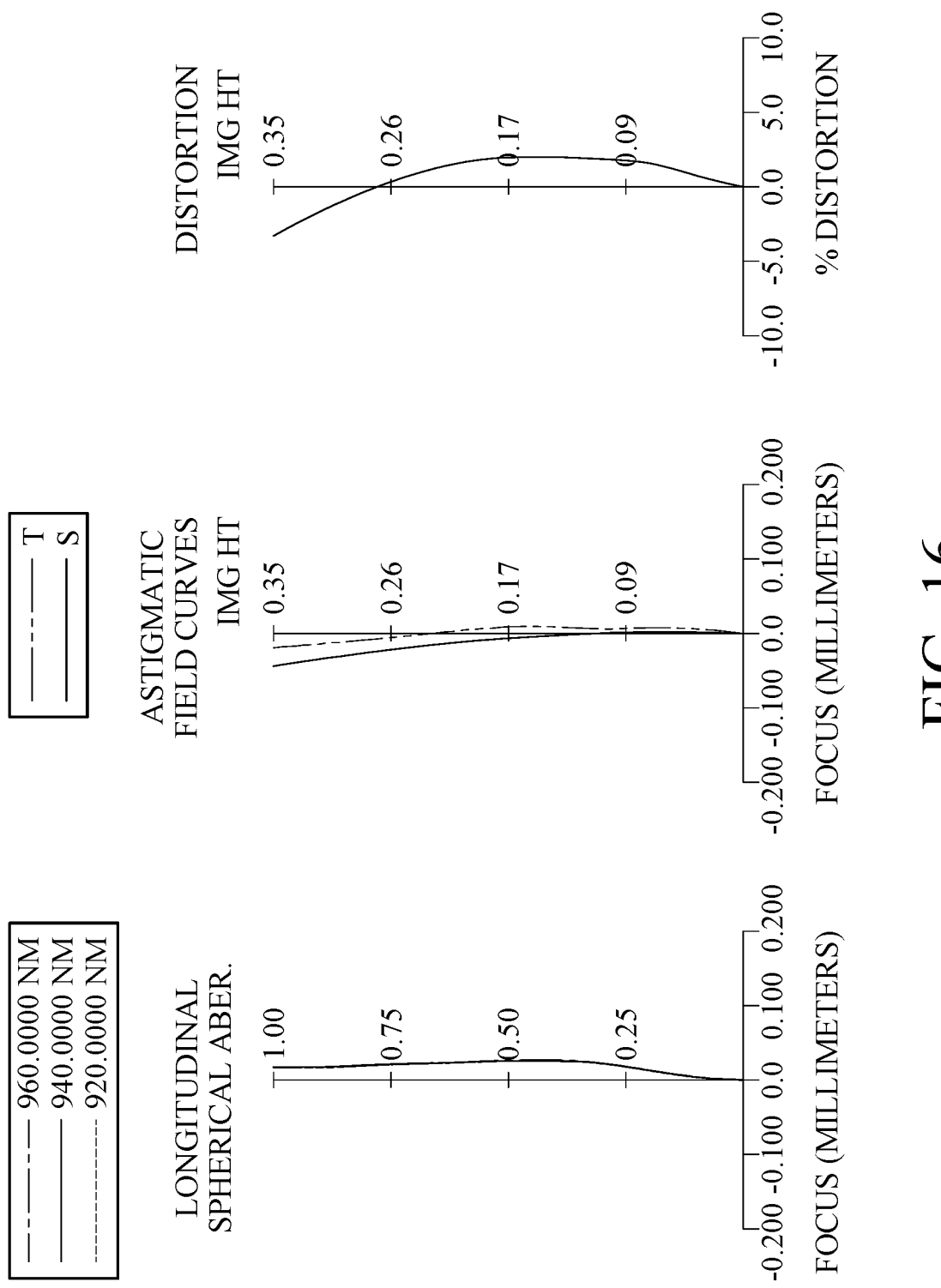
FIG. 16 shows spherical aberration curves, astigmatic field curves and a distortion curve of the receiver of the time of flight sensing module according to the 8th embodiment.

FIG. 15 is a schematic view of a receiver of a time of flight sensing module according to the 8th embodiment of the present disclosure. FIG. 16 shows, in order from left to right, spherical aberration curves, astigmatic field curves and a distortion curve of the receiver of the time of flight sensing module according to the 8th embodiment. In FIG. 15, the receiver 8 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The image sensor IS is disposed on or near the image surface IMG of the optical lens system.

The detailed optical data of the 8th embodiment are shown in Table 15 and the aspheric surface data are shown in Table 16 below.

TABLE 15

| Sur-face # | | Curvature Radius | Thick-ness | Ma-te-rial | Index | Abbe # | Focal Length |
|---|---|---|---|---|---|---|---|
| 0 | Object | Plano | Infinity | | | | |
| 1 | Ape. Stop | Plano | 0.018 | | | | |
| 2 | Lens 1 | 1.0307 (ASP) | 0.307 | Plas-tic | 1.634 | 20.400 | 0.35 |
| 3 | | −0.2496 (ASP) | −0.073 | | | | |
| 4 | Stop | Plano | 0.137 | | | | |
| 5 | Lens 2 | −0.1692 (ASP) | 0.180 | Plas-tic | 1.634 | 20.400 | 1.85 |
| 6 | | −0.2090 (ASP) | 0.316 | | | | |
| 7 | Image | Plano | — | | | | |

8th Embodiment
f = 0.44 mm, Fno = 1.30, HFOV = 39.0 deg.

Note:
Reference wavelength is 940.0 nm.
An effective radius of the stop S1 (Surface 4) is 0.270 mm.

TABLE 16

| | | Aspheric Coefficients | | |
|---|---|---|---|---|
| Surface # | 2 | 3 | 5 | 6 |
| k= | −3.18827E+00 | −1.17070E+00 | −1.96134E+00 | −7.39813E+00 |
| A4= | −3.06450E+01 | 4.74753E+00 | −1.43420E+01 | −6.84080E+01 |
| A6= | 3.44554E+03 | −2.37851E+02 | 4.72978E+02 | 3.25900E+03 |
| A8= | −2.59503E+05 | 3.91101E+03 | −1.75442E+04 | −1.18639E+05 |
| A10= | 1.02321E+07 | −2.08278E+04 | 7.85398E+05 | 3.16802E+06 |
| A12= | −2.09251E+08 | 3.60129E+04 | −1.77905E+07 | −5.93494E+07 |
| A14= | 1.73138E+09 | −9.89319E+04 | 2.16179E+08 | 7.63835E+08 |
| A16= | — | — | −1.39017E+09 | −6.40382E+09 |
| A18= | — | — | 3.75209E+09 | 3.12812E+10 |
| A20= | — | — | — | −6.70174E+10 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.44 | FOV [deg.] | 78.08 |
| Fno | 1.30 | SD/TD | 1.03 |
| HFOV [deg.] | 39.0 | TD/EPD | 1.64 |
| V2 | 20.400 | EPD/CTmax | 1.10 |
| ΣVi | 40.8 | EPD/BL | 1.07 |
| V1/N1 | 12.5 | EPD/Ymax | 1.16 |
| V2/N2 | 12.5 | EPD/ImgH | 0.96 |
| (Vi/Ni)min | 12.5 | EPD/T12 | 5.26 |
| Nmax | 1.634 | TL/ImgH | 2.48 |
| T12/CT1 | 0.21 | TL/f | 1.98 |
| f1/f2 | 0.19 | TL [mm] | 0.87 |
| f/EPD | 1.30 | RI [%] | 45.3 |
| BL/TL | 0.36 | — | — |

9th Embodiment

Figure 17:
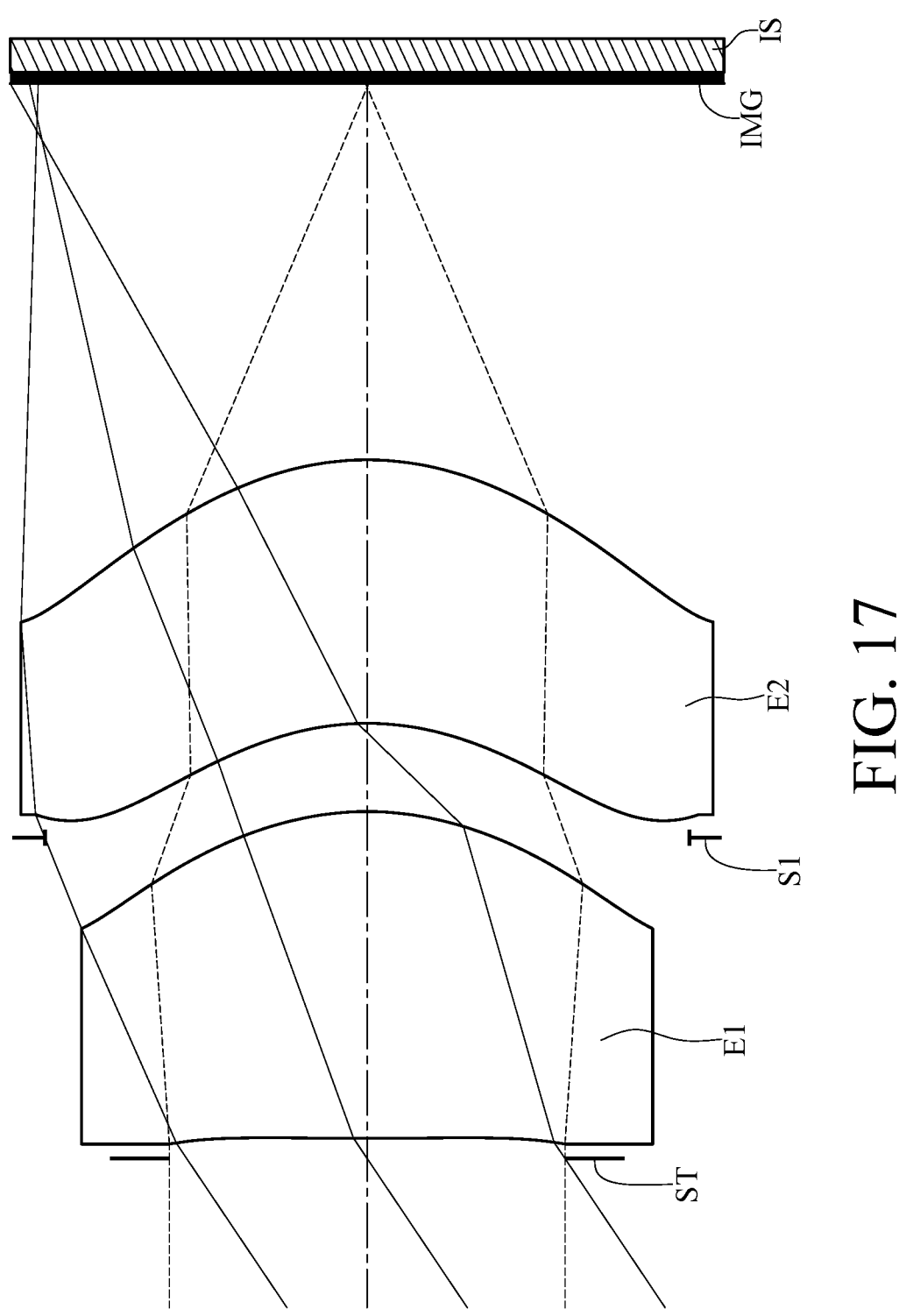
FIG. 17 is a schematic view of a receiver of a time of flight sensing module according to the 9th embodiment of the present disclosure.
Figure 18:
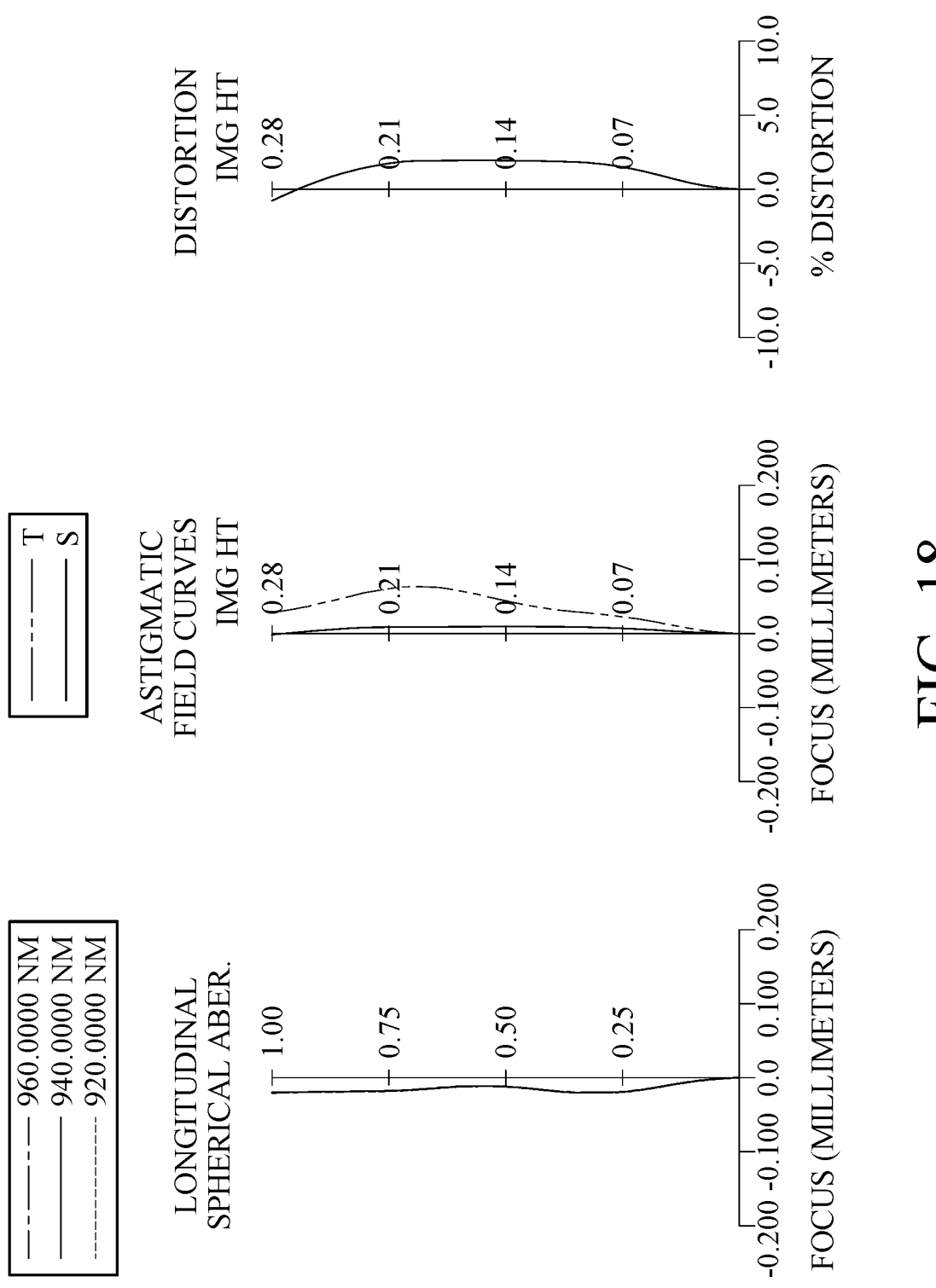
FIG. 18 shows spherical aberration curves, astigmatic field curves and a distortion curve of the receiver of the time of flight sensing module according to the 9th embodiment.

FIG. 17 is a schematic view of a receiver of a time of flight sensing module according to the 9th embodiment of the present disclosure. FIG. 18 shows, in order from left to right, spherical aberration curves, astigmatic field curves and a distortion curve of the receiver of the time of flight sensing module according to the 9th embodiment. In FIG. 17, the receiver 9 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has two inflection points. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The image sensor IS is disposed on or near the image surface IMG of the optical lens system.

The detailed optical data of the 9th embodiment are shown in Table 17 and the aspheric surface data are shown in Table 18 below.

TABLE 17

| | | 9th Embodiment f = 0.43 mm, Fno = 1.30, HFOV = 33.9 deg. | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | 0.017 | | | | |
| 2 | Lens 1 | −100.0000 (ASP) | 0.274 | Plastic | 1.634 | 20.400 | 0.40 |
| 3 | | −0.2512 (ASP) | −0.022 | | | | |
| 4 | Ape. Stop | Plano | 0.096 | | | | |
| 5 | Lens 2 | −0.2333 (ASP) | 0.221 | Plastic | 1.634 | 20.400 | 1.18 |
| 6 | | −0.2434 (ASP) | 0.316 | | | | |
| 7 | Image | Plano | — | | | | |

Note:
Reference wavelength is 940.0 nm.
An effective radius of the stop S1 (Surface 4) is 0.270 mm.

TABLE 18

| | | Aspheric Coefficients | | |
|---|---|---|---|---|
| Surface # | 2 | 3 | 5 | 6 |
| k= | 9.00000E+01 | −1.26277E+00 | −2.19650E+00 | −3.67531E+00 |
| A4= | 4.94709E+01 | 1.38498E+01 | −6.65608E+00 | −1.43492E+01 |
| A6= | −1.10285E+04 | −1.17097E+03 | 3.16069E+02 | −3.40836E+02 |
| A8= | 1.09481E+06 | 5.03162E+04 | −9.18702E+03 | 3.95720E+04 |
| A10= | −6.22239E+07 | −1.21143E+06 | 2.80506E+05 | −1.44942E+06 |
| A12= | 2.01200E+09 | 1.55011E+07 | −3.77810E+06 | 2.87179E+07 |
| A14= | −3.45243E+10 | −7.80713E+07 | 2.12519E+07 | −3.22429E+08 |
| A16= | 2.44784E+11 | — | −3.76148E+07 | 1.93100E+09 |
| A18= | — | — | — | −4.77191E+09 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.43 | FOV [deg.] | 67.72 |
| Fno | 1.30 | SD/TD | 1.03 |
| HFOV [deg.] | 33.9 | TD/EPD | 1.72 |
| V2 | 20.400 | EPD/CTmax | 1.21 |
| ΣVi | 40.8 | EPD/BL | 1.05 |
| V1/N1 | 12.5 | EPD/Ymax | 1.14 |
| V2/N2 | 12.5 | EPD/ImgH | 1.17 |
| (Vi/Ni)min | 12.5 | EPD/T12 | 4.48 |
| Nmax | 1.634 | TL/ImgH | 3.13 |
| T12/CT1 | 0.27 | TL/f | 2.05 |
| f1/f2 | 0.34 | TL [mm] | 0.88 |
| f/EPD | 1.30 | RI [%] | 56.0 |
| BL/TL | 0.36 | — | — |

10th Embodiment

Figure 19:
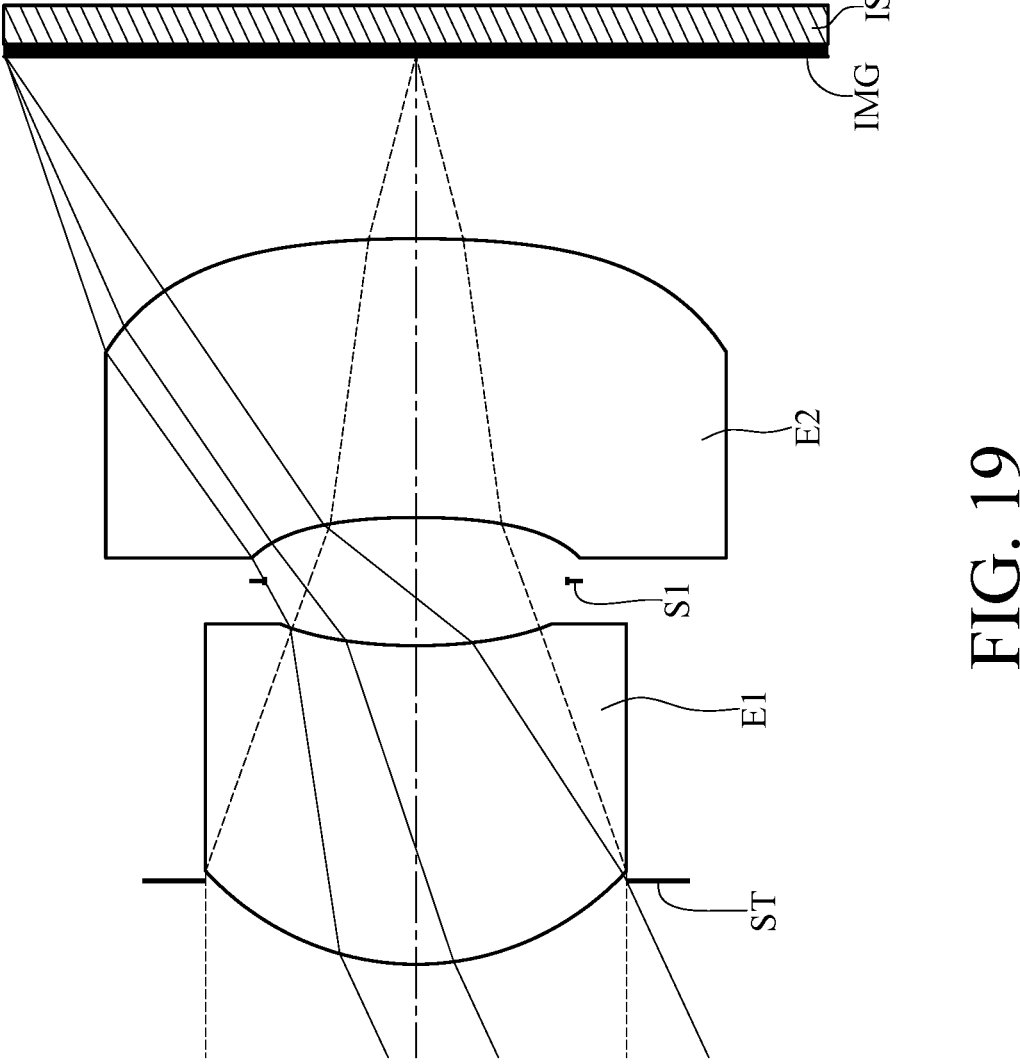
FIG. 19 is a schematic view of a receiver of a time of flight sensing module according to the 10th embodiment of the present disclosure.
Figure 20:
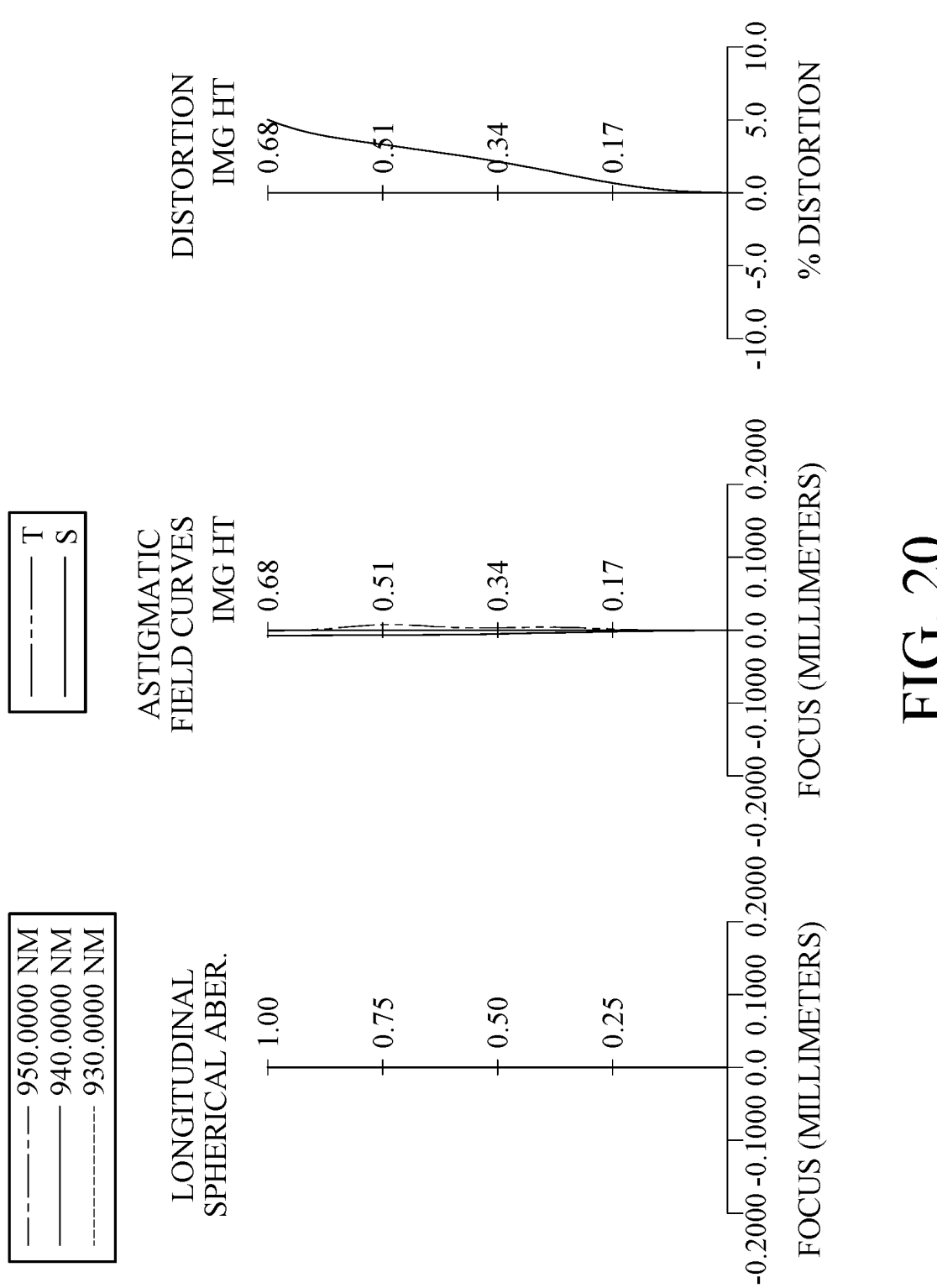
FIG. 20 shows spherical aberration curves, astigmatic field curves and a distortion curve of the receiver of the time of flight sensing module according to the 10th embodiment.

FIG. 19 is a schematic view of a receiver of a time of flight sensing module according to the 10th embodiment of the present disclosure. FIG. 20 shows, in order from left to right, spherical aberration curves, astigmatic field curves and a distortion curve of the receiver of the time of flight sensing module according to the 10th embodiment. In FIG. 19, the receiver 10 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric.

The image sensor IS is disposed on or near the image surface IMG of the optical lens system.

The detailed optical data of the 10th embodiment are shown in Table 19 and the aspheric surface data are shown in Table 20 below.

TABLE 19

10th Embodiment
f = 1.39 mm, Fno = 2.00, HFOV = 26.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.138 | | | | |

TABLE 19-continued

10th Embodiment
f = 1.39 mm, Fno = 2.00, HFOV = 26.8 deg.

| Surface # | | Curvature Radius | Thickness | Material | Index | Abbe # | Focal Length |
|---|---|---|---|---|---|---|---|
| 2 | Lens 1 | 0.4622 (ASP) | 0.527 | Plastic | 1.581 | 30.055 | 1.14 |
| 3 | | 0.8817 (ASP) | 0.107 | | | | |
| 4 | Ape. Stop | Plano | 0.105 | | | | |
| 5 | Lens 2 | −1.1230 (ASP) | 0.461 | Plastic | 1.655 | 18.400 | −5.77 |
| 6 | | −1.8577 (ASP) | 0.301 | | | | |
| 7 | Image | Plano | — | | | | |

Note:
Reference wavelength is 940.0 nm.
An effective radius of the stop S1 (Surface 4) is 0.250 mm.

TABLE 20

Aspheric Coefficients

| Surface # | 2 | 3 | 5 | 6 |
|---|---|---|---|---|
| k= | −1.25654E+00 | −1.92059E+01 | −3.18249E+01 | −3.15162E+00 |
| A4= | 1.37546E+00 | 4.93535E+00 | −5.99261E+00 | −8.49383E−01 |
| A6= | 6.48977E+00 | 2.32361E+01 | −3.51464E+01 | −3.15199E+00 |
| A8= | −1.14033E+02 | −2.74311E+03 | 2.35681E+03 | −2.23302E+01 |
| A10= | 2.00792E+03 | 1.08056E+05 | −8.14647E+04 | 3.73038E+02 |
| A12= | −1.82800E+04 | −1.98174E+06 | 1.29913E+06 | −2.35241E+03 |
| A14= | 8.93033E+04 | 1.78199E+07 | −1.03223E+07 | 6.84430E+03 |
| A16= | −1.73840E+05 | −5.56941E+07 | 2.86263E+07 | −8.02406E+03 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.39 | FOV [deg.] | 49.96 |
| Fno | 2.00 | SD/TD | 0.89 |
| HFOV [deg.] | 25.0 | TD/EPD | 1.73 |
| V2 | 18.400 | EPD/CTmax | 1.32 |
| ΣVi | 48.5 | EPD/BL | 2.31 |
| V1/N1 | 19.0 | EPD/Ymax | 1.36 |
| V2/N2 | 11.1 | EPD/ImgH | 1.02 |
| (Vi/Ni)min | 11.1 | EPD/T12 | 3.28 |
| Nmax | 1.655 | TL/ImgH | 2.21 |
| T12/CT1 | 0.40 | TL/f | 1.08 |
| f1/f2 | −0.20 | TL [mm] | 1.50 |
| f/EPD | 2.00 | RI [%] | 40.7 |
| BL/TL | 0.20 | — | — |

11th Embodiment

Figure 21:
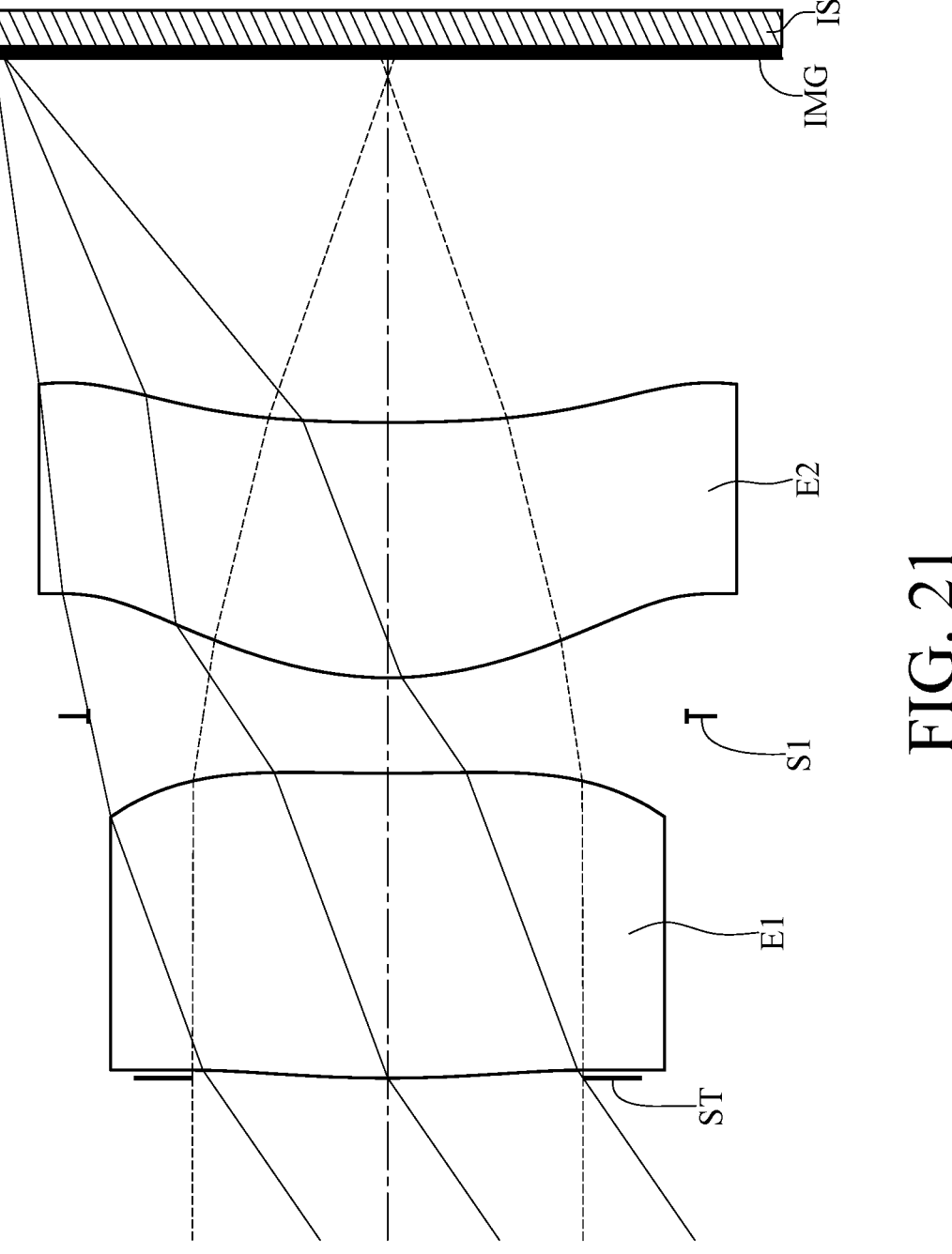
FIG. 21 is a schematic view of a receiver of a time of flight sensing module according to the 11th embodiment of the present disclosure.
Figure 22:
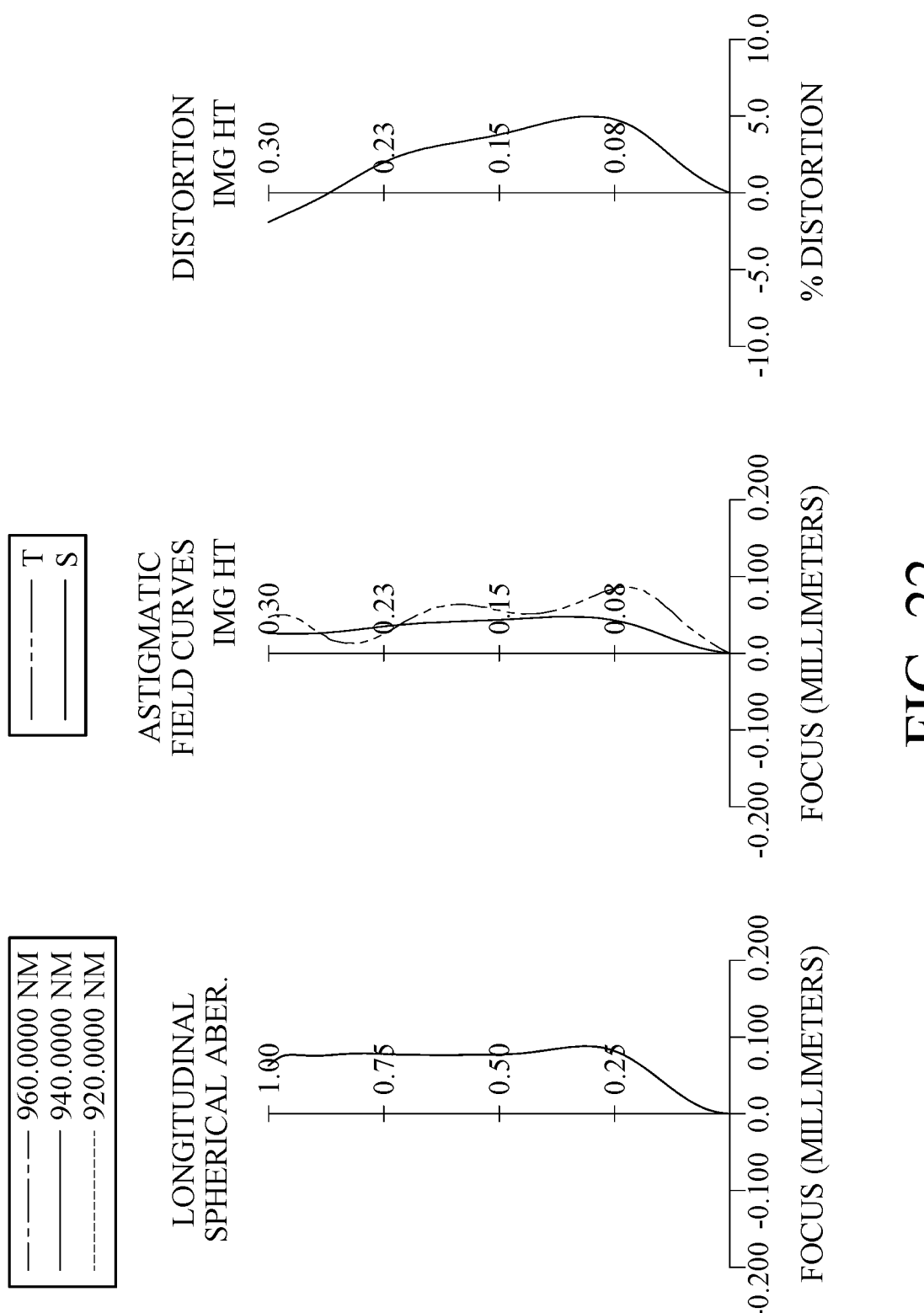
FIG. 22 shows spherical aberration curves, astigmatic field curves and a distortion curve of the receiver of the time of flight sensing module according to the 11th embodiment.

FIG. 21 is a schematic view of a receiver of a time of flight sensing module according to the 11th embodiment of the present disclosure. FIG. 22 shows, in order from left to right, spherical aberration curves, astigmatic field curves and a distortion curve of the receiver of the time of flight sensing module according to the 11th embodiment. In FIG. 21, the receiver 11 of the time of flight sensing module includes the optical lens system (its reference numeral is omitted) of the present disclosure and an image sensor IS. The optical lens system includes, in order from an object side to an image side along an optical path, an aperture stop ST, a first lens element E1, a stop S1, a second lens element E2 and an image surface IMG. The optical lens system includes two lens elements (E1 and E2) with no additional lens element disposed between each of the adjacent two lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has two inflection points. The image-side surface of the first lens element E1 has two inflection points.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points.

The image sensor IS is disposed on or near the image surface IMG of the optical lens system.

The detailed optical data of the 11th embodiment are shown in Table 21 and the aspheric surface data are shown in Table 22 below.

TABLE 21

11th Embodiment
f = 0.40 mm, Fno = 1.30, HFOV = 34.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.000 | | | | |
| 2 | Lens 1 | 0.8639 | (ASP) | 0.239 | Plastic | 1.630 | 33.792 | 1.99 |
| 3 | | 2.4792 | (ASP) | 0.045 | | | | |
| 4 | Ape. Stop | Plano | | 0.030 | | | | |
| 5 | Lens 2 | 0.2496 | (ASP) | 0.200 | Plastic | 1.656 | 18.384 | 0.43 |
| 6 | | 1.4632 | (ASP) | 0.285 | | | | |
| 7 | Image | Plano | | — | | | | |

Note:
Reference wavelength is 940.0 nm.
An effective radius of the stop S1 (Surface 4) is 0.234 mm.

TABLE 22

Aspheric Coefficients

| Surface # | 2 | 3 | 5 | 6 |
|---|---|---|---|---|
| k= | −5.33281E+00 | 3.85729E+01 | −4.92562E+01 | 4.47911E−01 |
| A4= | −1.01160E+02 | 2.41807E+01 | 1.55890E+02 | 2.36286E+00 |
| A6= | 4.02453E+04 | −1.33502E+04 | −1.59061E+04 | 1.04637E+03 |
| A8= | −8.98512E+06 | 1.87725E+06 | 1.05424E+06 | −6.13469E+04 |

TABLE 22-continued

Aspheric Coefficients

| Surface # | 2 | 3 | 5 | 6 |
|---|---|---|---|---|
| A10= | 1.16982E+09 | −1.52763E+08 | −4.57177E+07 | 1.67986E+06 |
| A12= | −9.38402E+10 | 7.63773E+09 | 1.28961E+09 | −2.43324E+07 |
| A14= | 4.69652E+12 | −2.37386E+11 | −2.33473E+10 | 1.23043E+08 |
| A16= | −1.42655E+14 | 4.46374E+12 | 2.60172E+11 | 1.20542E+09 |
| A18= | 2.39984E+15 | −4.64397E+13 | −1.61767E+12 | −1.89696E+10 |
| A20= | −1.70888E+16 | 2.05028E+14 | 4.28331E+12 | 7.27475E+10 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

11th Embodiment

| | | | |
|---|---|---|---|
| f [mm] | 0.40 | FOV [deg.] | 69.08 |
| Fno | 1.30 | SD/TD | 1.00 |
| HFOV [deg.] | 34.5 | TD/EPD | 1.68 |
| V2 | 18.384 | EPD/CTmax | 1.28 |
| ΣVi | 52.2 | EPD/BL | 1.07 |
| V1/N1 | 20.7 | EPD/Ymax | 1.12 |
| V2/N2 | 11.1 | EPD/ImgH | 1.02 |
| (Vi/Ni)min | 11.1 | EPD/T12 | 4.09 |
| Nmax | 1.656 | TL/ImgH | 2.66 |
| T12/CT1 | 0.31 | TL/f | 2.01 |
| f1/f2 | 4.62 | TL [mm] | 0.80 |
| f/EPD | 1.30 | RI [%] | 69.8 |
| BL/TL | 0.36 | — | — |

12th Embodiment

Figure 23:
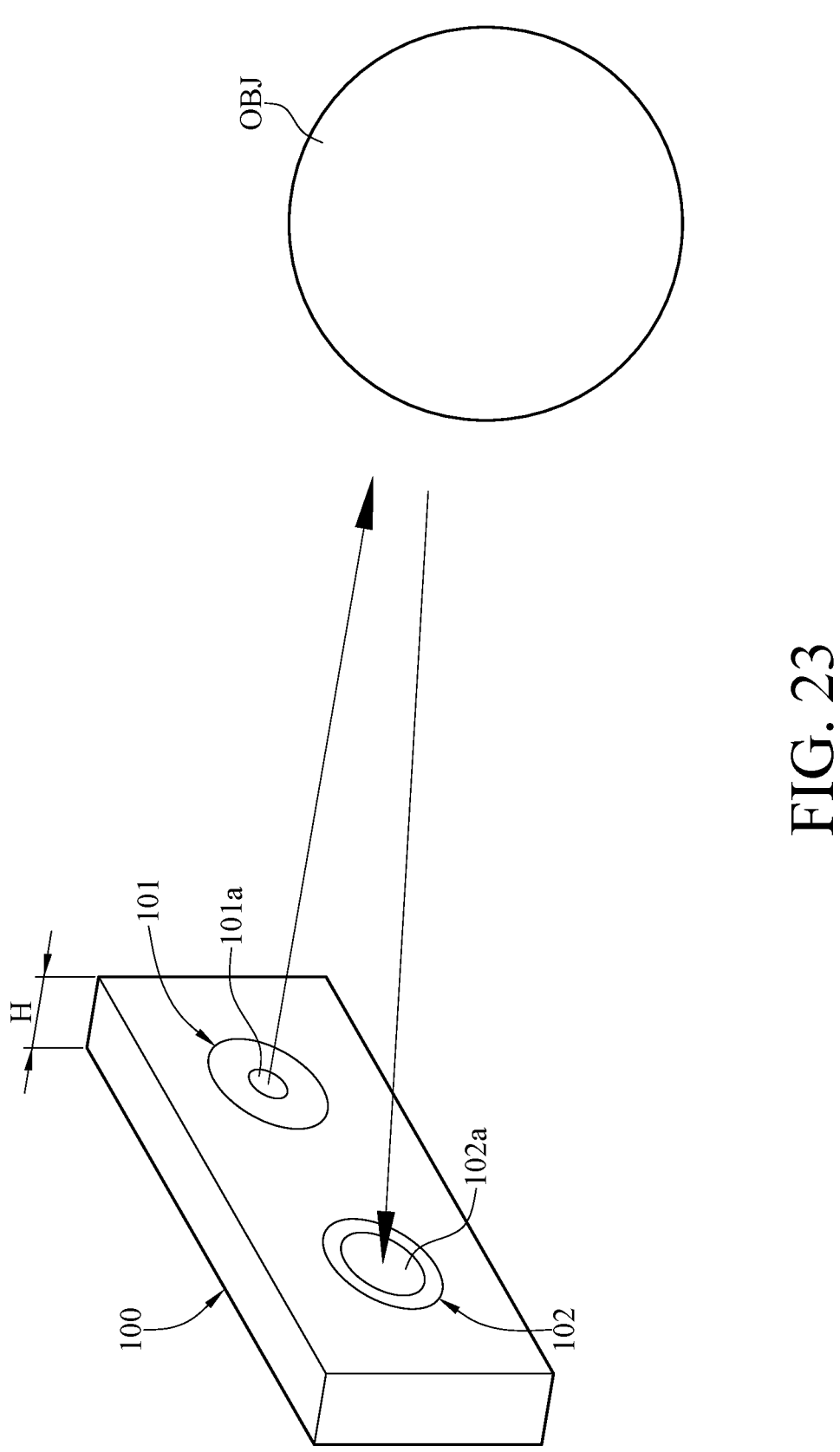
FIG. 23 is a perspective view of a time of flight sensing module according to the 12th embodiment of the present disclosure.
Figure 24:
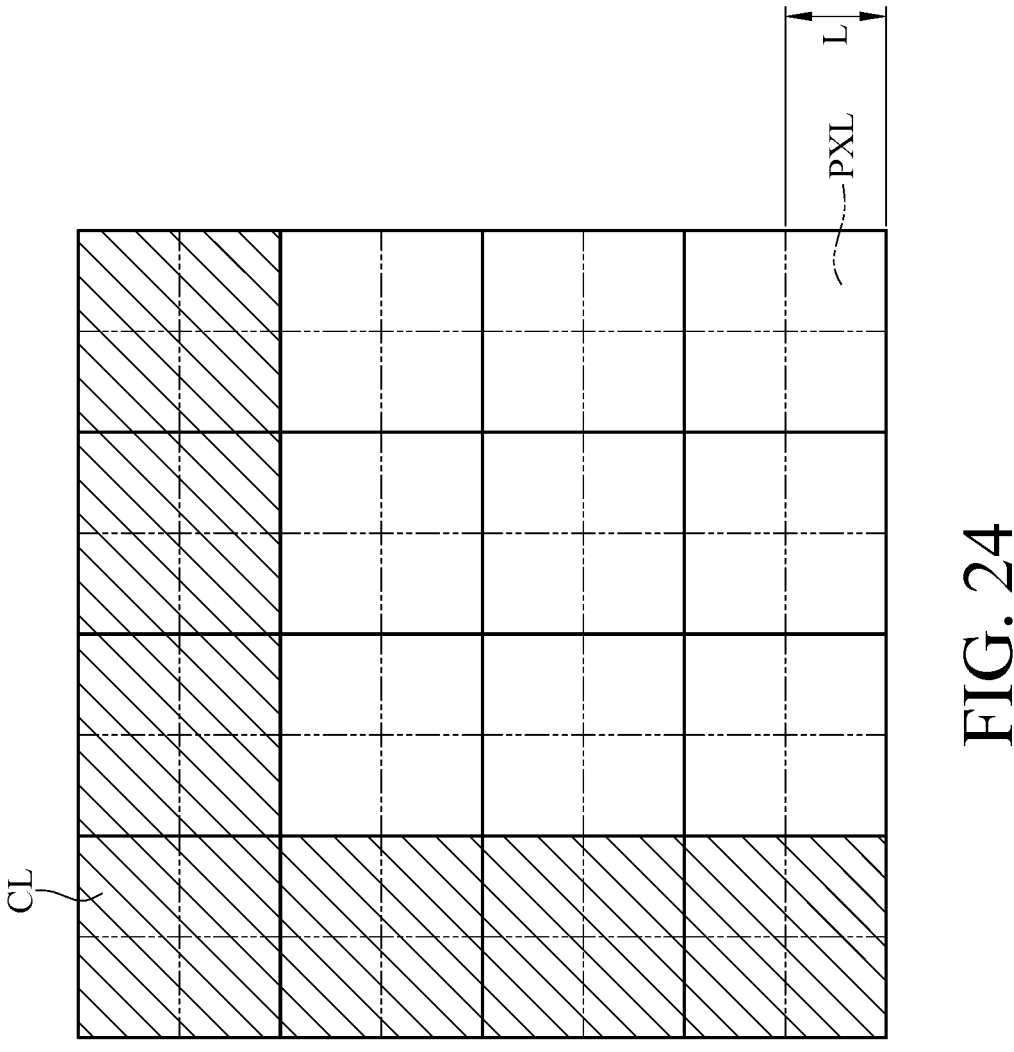
FIG. 24 is a schematic view of an image sensor of the time of flight sensing module in FIG. 23.

FIG. 23 is a perspective view of a time of flight sensing module according to the 12th embodiment of the present disclosure. FIG. 24 is a schematic view of an image sensor of the time of flight sensing module in FIG. 23. In this embodiment, a time of flight sensing module 100 is a kind of sensing module, and a height of the time of flight sensing module 100 can be smaller than 3.0 millimeters. Therefore, it is favorable for providing the feasibility of lightness and thinness of an electronic device. Moreover, the height of the time of flight sensing module 100 can also be smaller than 2.0 millimeters. In this embodiment, as shown in FIG. 23, the height H of the time of flight sensing module 100 is 1.5 millimeters and relatively parallel to an optical axis of an optical lens system of a sensing lens 102*a*.

The time of flight sensing module 100 includes an emitter 101 and a receiver 102. The emitter 101 includes a light source 101*a*. The light source 101*a* of the emitter 101 can emit light with a specific wavelength to an object OBJ, and the light with the specific wavelength is received by the receiver 102 after being reflected by the object OBJ. The signal data of the received light, such as time difference and phase difference, can be calculated so as to obtain related information of the object OBJ, such as the shape of the object OBJ and the distance between the object OBJ and the receiver 102. Specifically, the light source 101*a* can include a light emitting diode (LED) or a laser diode (LD). The time of flight sensing module 100 can use the LED or the LD to emit infrared light, and the infrared light can be reflected by the object OBJ. The receiver 102 can include an infrared image sensor for measuring the transmitting time of reflected light which is reflected at different depth positions of the object OBJ, and thus the shape of the object OBJ and the distance between the object OBJ and the receiver 102 can be calculated through a simple mathematical function. Moreover, the time of flight sensing module 100 can be arranged to a direct ToF (D-ToF) configuration that uses a pulsed light source for measuring time difference, or an indirect ToF (I-ToF) configuration that uses a non-pulsed continued light source for measuring phase difference, based on the measured distance, measured time and the required accuracy. Moreover, the laser diode of the light source 101*a* can use a vertical-cavity surface-emitting laser light source (VCSEL), which has more advantages than the conventional edge-emitting laser, such as providing circular light emitting and easy to be made into a matrix. Moreover, the emitter 101 can further include a diffuser (not shown). By disposing the diffuser, it is favorable for diffusing light from a light guide plate so as to increase light emitting area and received reflection light information.

The receiver 102 can include the sensing lens 102*a*. The sensing lens 102*a* can provide a relatively large aperture, a proper recognition angle, and a good recognition ability, and the sensing lens 102*a* is favorable for meeting the required miniaturization of the time of flight sensing module 100. The sensing lens 102*a* can be applied to driving safety recognition, smart driving, fast focusing, night image capturing, interactive game consoles, distance sensing, 3D (three-dimensional) shape sensing, etc. The time of flight sensing module 100 including the sensing lens 102*a* has a larger sensing area and more sensing information than the conventional type of laser focusing, thereby preventing sensing failure or incorrect sensing information due to the different materials on the sensed surfaces, the different depths on the boundaries of the sensed objects or the sensing blind spot. Moreover, comparing with the typical sensing module that uses structured light, since the time of flight sensing module 100 including the sensing lens 102*a* can save more time for obtaining depth information by using time difference calculation than using deformation calculation, the time of flight sensing module 100 including the sensing lens 102*a* is more suitable for real-time sampling application.

The sensing lens 102*a* can include the optical lens system and the image sensor IS disclosed in the 1st embodiment. However, the sensing lens 102*a* may alternatively be provided with the optical lens system disclosed in other above-mentioned embodiments, and the present disclosure is not limited thereto. The optical lens system can include a lens accommodation apparatus (not shown) and the first lens element E1 and the second lens element E2 that are disclosed in the 1st embodiment and are disposed in the lens accommodation apparatus. The image sensor IS disposed on the image surface IMG of the 1st embodiment and a sensing area of the image sensor IS can include at least four sensing cells. Therefore, it is favorable for providing a sensing ability of the device for measuring object distance change at different positions rather than a single-point distance measurement. Moreover, the sensing area of the image sensor IS can also include at least sixteen sensing cells. Moreover, the sensing area of the image sensor IS can also include at least sixty-four sensing cells. In this embodiment, as shown in FIG. 24, the sensing area of the image sensor IS include sixteen sensing cells CL, with each sensing cell CL including four pixels PXL. Note that solid lines are used in FIG.

24 for representing the edge of every sensing cell CL, and only seven sensing cells CL are exemplarily shown with slanted lines inside for simplicity. A pixel size of the image sensor IS can range between 5 micrometers (um) and 15 um. Therefore, it is favorable for balancing the light receiving area of a single size. In this embodiment, as shown in FIG. 24, the pixel size L of a pixel PXL is 10 um. Note that dash-double-dotted lines are used in FIG. 24 for representing the edge of every pixel PXL. The image sensor IS can include a single-photon avalanche diode (SPAD). Therefore, it is favorable for increasing sensing speed and sensitivity.

The quantity of the time of flight sensing module 100 is plural. The plurality of time of flight sensing modules 100 can be arranged into a matrix so as to form a light detection and ranging (LIDAR) device (not shown). In this embodiment, the LIDAR device can use a VCSEL source that carries high power so as to provide a relatively large and long 3D sensing range. Moreover, comparing with the conventional LIDAR, the LIDAR device of this embodiment can omit a rotation scanning mirror (movable component) so as to provide good image capturing stability and product reliability of overall LIDAR device.

13th Embodiment

Figure 25:
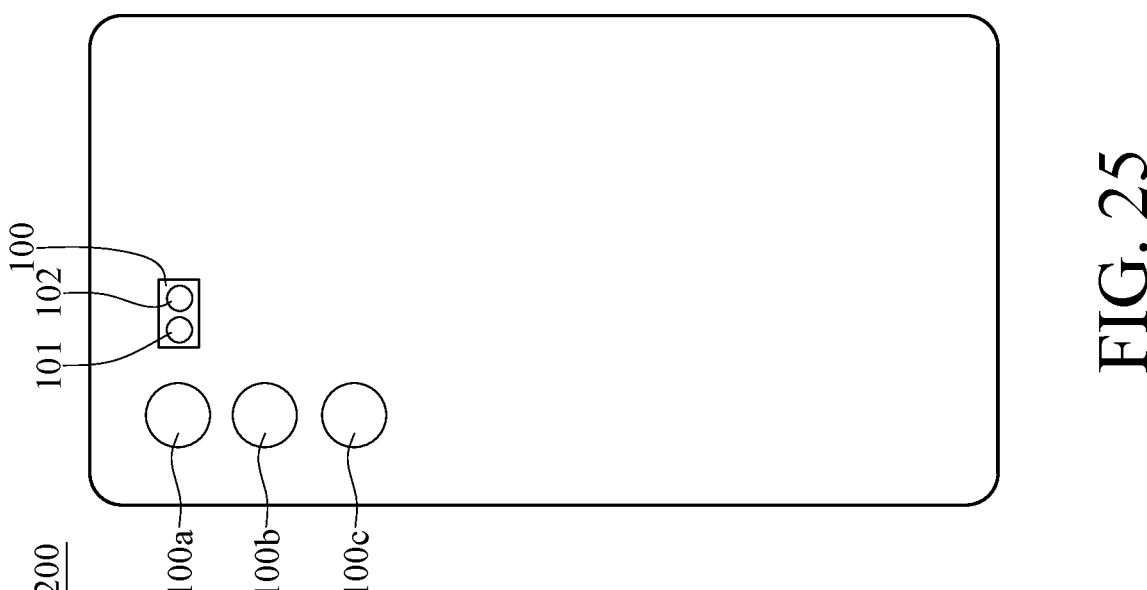
FIG. 25 is a rear view of an electronic device according to the 13th embodiment of the present disclosure.

FIG. 25 is a rear view of an electronic device according to the 13th embodiment of the present disclosure.

In this embodiment, an electronic device 200 is a smartphone including the time of flight sensing module 100 disclosed in the 12th embodiment, an image capturing unit 100*a*, an image capturing unit 100*b* and an image capturing unit 100*c*. The time of flight sensing module 100, the image capturing unit 100*a*, the image capturing unit 100*b* and the image capturing unit 100*c* are disposed on the same side of the electronic device 200. Furthermore, each of the image capturing units 100*a*, 100*b* and 100*c* can include a lens unit, a driving device for assisting image focusing, an image sensor for the lens unit to image thereon and for transmitting image information, and an image stabilizer for increasing image quality with high photosensitivity and low noise.

The time of flight sensing module 100 can determine depth information of the imaged object. The image capturing unit 100*a* is an ultra-wide-angle image capturing unit, the image capturing unit 100*b* is a wide-angle image capturing unit, and the image capturing unit 100*c* is a telephoto image capturing unit. In this embodiment, the image capturing units 100*a*, 100*b*, 100*c* have different fields of view, such that the electronic device 200 can have various magnification ratios so as to meet the requirement of optical zoom functionality. In this embodiment, the electronic device 200 includes multiple image capturing units 100*a*, 100*b* and 100*c*, but the present disclosure is not limited to the number and arrangement of image capturing units.

14th Embodiment

Figure 26:
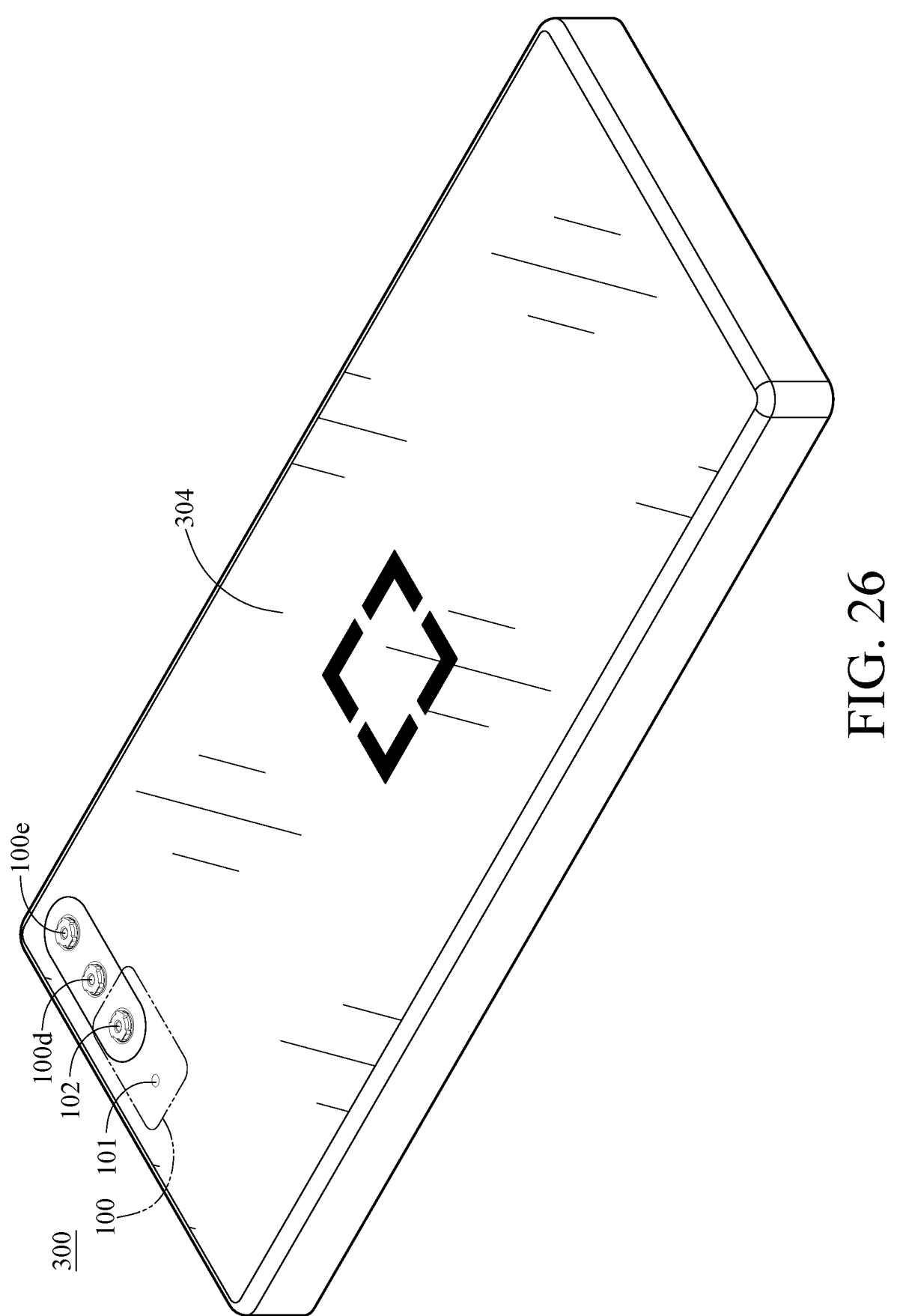
FIG. 26 is one perspective view of an electronic device according to the 14th embodiment of the present disclosure.
Figure 27:
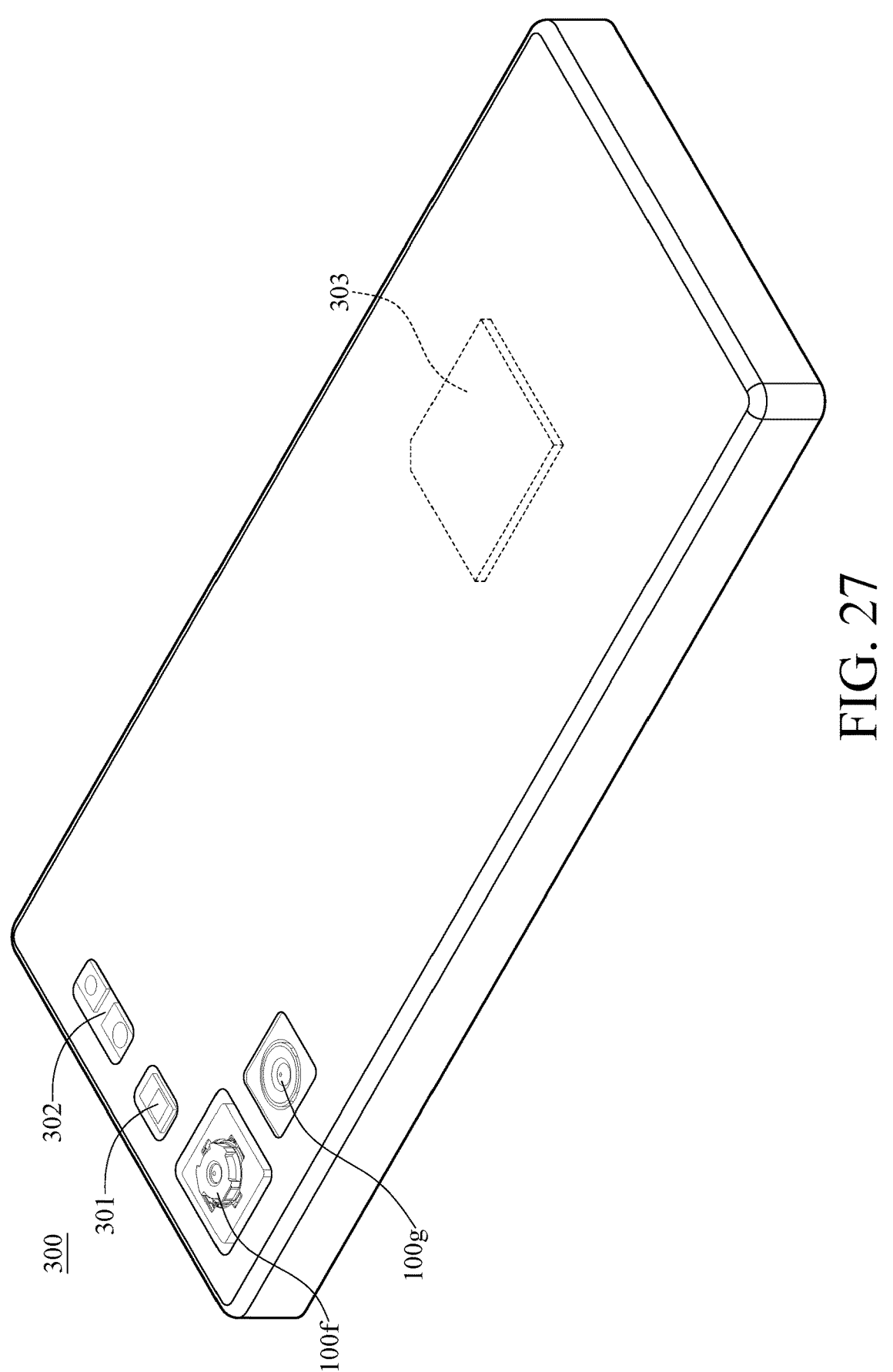
FIG. 27 is another perspective view of the electronic device in FIG. 26.
Figure 28:
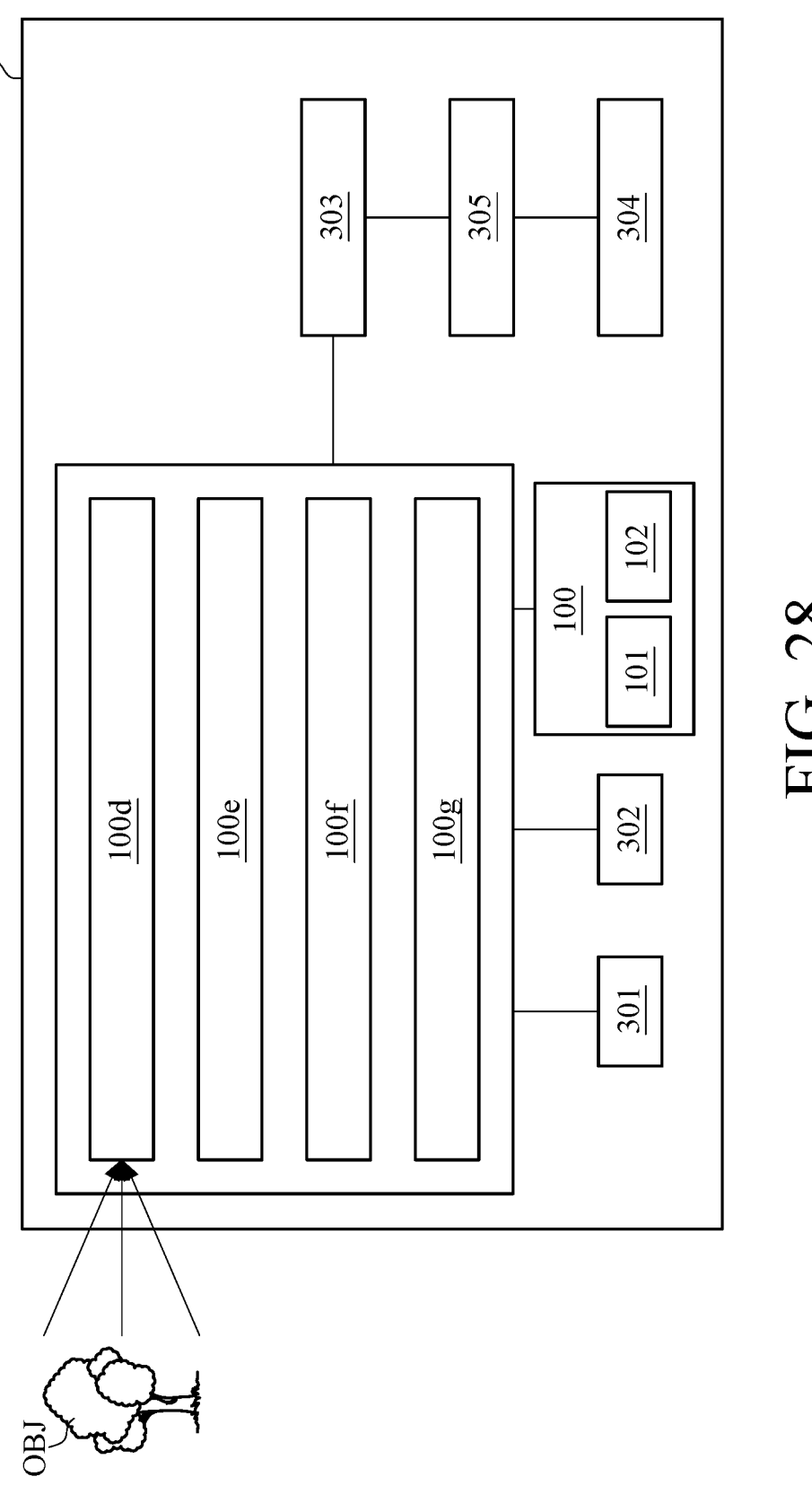
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 300 is a smartphone including the time of flight sensing module 100 disclosed in the 12th embodiment, an image capturing unit 100*d*, an image capturing unit 100*e*, an image capturing unit 100*f*, an image capturing unit 100*g*, a flash module 301, a focus assist module 302, an image signal processor 303, a display unit 304 and an image software processor 305. The time of flight sensing module 100, the image capturing unit 100*d*, the image capturing unit 100*e* and the display unit 304 are disposed on the same side of the electronic device 300 and the display unit 304 is a user interface, such that the image capturing units 100*d*, 100*e* can be front-facing cameras of the electronic device 300 for taking selfies, but the present disclosure is not limited thereto. The image capturing unit 100*f* and the image capturing unit 100*g* are disposed on the opposite side of the electronic device 300. The focus assist module 302 can emit laser light beam or can be a time of flight sensing module, but the present disclosure is not limited thereto.

The time of flight sensing module 100 can determine depth information of the imaged object. The image capturing unit 100*d* is an ultra-wide-angle image capturing unit, the image capturing unit 100*e* is a wide-angle image capturing unit, the image capturing unit 100*f* is a wide-angle image capturing unit, and the image capturing unit 100*g* is an ultra-wide-angle image capturing unit. In this embodiment, the image capturing units 100*d*, 100*e* or the image capturing units 100*f*, 100*g* have different fields of view, such that the electronic device 300 can have various magnification ratios so as to meet the requirement of optical zoom functionality. In this embodiment, the electronic device 300 includes multiple image capturing units 100*d*, 100*e*, 100*f* and 100*g*, but the present disclosure is not limited to the number and arrangement of image capturing units.

When a user captures images of an object OBJ, the light rays converge in the image capturing unit 100*d*, the image capturing unit 100*e*, the image capturing unit 100*f* or the image capturing unit 100*g* to generate images, and the flash module 301 is activated for light supplement. The time of flight sensing module 100 or the focus assist module 302 detects the object distance of the imaged object OBJ to achieve fast auto focusing. The image signal processor 303 is configured to optimize the captured image to improve image quality. The light beam emitted from the focus assist module 302 can be either conventional infrared or laser. The display unit 304 can include a touch screen, and the user is able to interact with the display unit 304 and the image software processor 305 having multiple functions to capture images and complete image processing. Alternatively, the user may capture images via a physical button. The image processed by the image software processor 305 can be displayed on the display unit 304.

15th Embodiment

Figure 29:
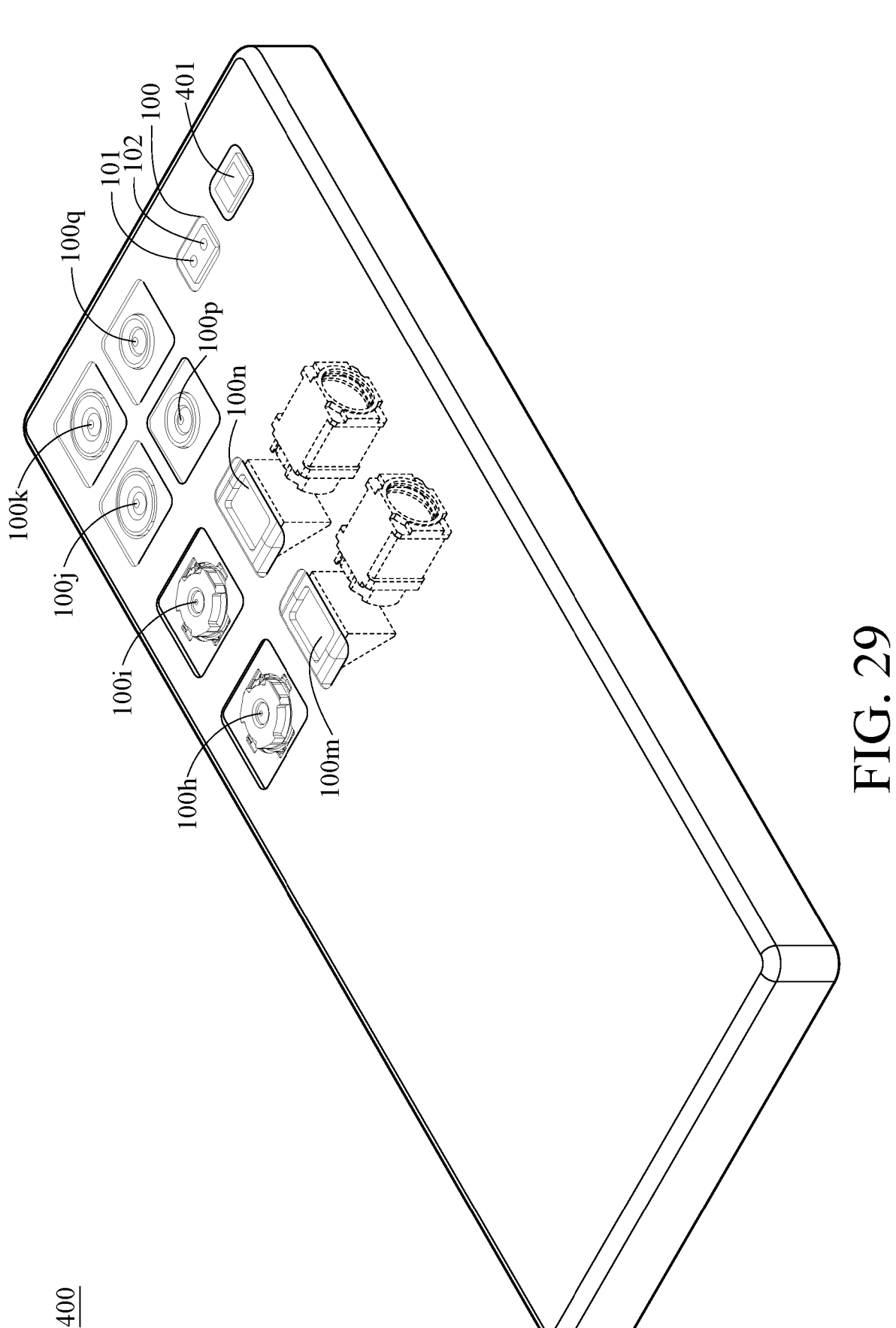
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 400 is a smartphone including the time of flight sensing module 100 disclosed in the 12th embodiment, an image capturing unit 100*h*, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, a flash module 401, a focus assist module, an image signal processor, a display unit and an image software processor (not shown). The time of flight sensing module 100, the image capturing units 100*h*, 100*i*, 100*j*, 100*k*, 100*m*, 100*n*, 100*p* and 100*q* are disposed on the same side of the electronic device 400, while the display unit is disposed on the opposite side of the electronic device 400.

The time of flight sensing module 100 can determine depth information of the imaged object. The image capturing unit 100*h* is a wide-angle image capturing unit, the image capturing unit 100*i* is a wide-angle image capturing unit, the image capturing unit 100*j* is an ultra-wide-angle image capturing unit, the image capturing unit 100*k* is an ultra-wide-angle image capturing unit, the image capturing unit 100*m* is a telephoto image capturing unit, the image capturing unit 100*n* is a telephoto image capturing unit, the image capturing unit 100*p* is a telephoto image capturing unit, and the image capturing unit 100*q* is a telephoto image capturing unit. In this embodiment, the image capturing units 100*h*, 100*i*, 100*j*, 100*k*, 100*m*, 100*n*, 100*p* and 100*q* have different fields of view, such that the electronic device 400 can have various magnification ratios so as to meet the requirement of optical zoom functionality. Moreover, each of the image capturing units 100*m* and 100*n* can be a telephoto image capturing unit having a light-folding element configuration. Moreover, the light-folding element configuration of each of the image capturing unit 100*m* and 100*n* can be similar to, for example, one of the structures shown in FIG. 31 to FIG. 33 which can be referred to foregoing descriptions corresponding to FIG. 31 to FIG. 33 so the details in this regard will not be provided again. In this embodiment, the electronic device 400 includes multiple image capturing units 100*h*, 100*i*, 100*j*, 100*k*, 100*m*, 100*n*, 100*p* and 100*q*, but the present disclosure is not limited to the number and arrangement of image capturing units. When a user captures images of an object, the light rays converge in the image capturing unit 100*h*, 100*i*, 100*j*, 100*k*, 100*m*, 100*n*, 100*p* or 100*q* to generate images, and the flash module 401 is activated for light supplement. The time of flight sensing module 100 or the focus assist module detects the object distance of the imaged object to achieve fast auto focusing. Further, the subsequent processes are performed in a manner similar to the abovementioned embodiments, so the details in this regard will not be provided again.

The smartphone in this embodiment is only exemplary for showing the time of flight sensing module 100 of the present disclosure installed in an electronic device, and the present disclosure is not limited thereto. The time of flight sensing module 100 can be optionally applied to optical systems with a movable focus. Furthermore, the optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system comprising two lens elements, the two lens elements being, in order from an object side to an image side along an optical path, a first lens element and a second lens element, and each of the two lens elements has an object-side surface facing toward the object side and an image-side surface facing toward the image side;

wherein the image-side surface of the second lens element is concave in a paraxial region thereof and has at least one inflection point, at least one of the object-side surface and the image-side surface of at least one lens element of the optical lens system is aspheric, and a total number of the lens elements in the optical lens system is two;

wherein an Abbe number of the first lens element is V1, an Abbe number of the second lens element is V2, an Abbe number of the i-th lens element is Vi, a refractive index of the first lens element is N1, a refractive index of the second lens element is N2, a refractive index of the i-th lens element is Ni, a minimum value of Vi/Ni is (Vi/Ni)min, an axial distance between the object-side surface of the first lens element and an image surface is TL, a maximum field of view of the optical lens system is FOV, a relative illumination on an image periphery of the optical lens system is RI, and the following conditions are satisfied:

$$10.0 < V1 + V2 < 50.0;$$

$$(Vi/Ni)min < 13.0, \text{ wherein } i = 1 \text{ or } 2;$$

$$0.10 \text{ [mm]} < TL < 3.0 \text{ [mm]};$$

$$60 \text{ [deg.]} < FOV < 110 \text{ [deg.]; and}$$

$$50\% < RI.$$

2. The optical lens system of claim 1, wherein the second lens element has positive refractive power, and the object-side surface of the second lens element is convex in a paraxial region thereof.

3. The optical lens system of claim 1, wherein an axial distance between the image-side surface of the second lens element and the image surface is BL, the axial distance between the object-side surface of the first lens element and the image surface is TL, and the following condition is satisfied:

$$0 < BL/TL < 0.4.$$

4. The optical lens system of claim 1, wherein the Abbe number of the first lens element is Vi, the Abbe number of the second lens element is V2, the Abbe number of the i-th lens element is Vi, the refractive index of the first lens element is N1, the refractive index of the second lens element is N2, the refractive index of the i-th lens element is Ni, the minimum value of Vi/Ni is (Vi/Ni)min, and the following condition is satisfied:

$$(Vi/Ni)min < 12.0, \text{ wherein } i = 1 \text{ or } 2.$$

5. The optical lens system of claim 1, further comprising an aperture stop, wherein an axial distance between the aperture stop and the image-side surface of the second lens element is SD, an axial distance between the object-side surface of the first lens element and the image-side surface of the second lens element is TD, and the following condition is satisfied:

$$1.0 \leq SD/TD < 1.10.$$

6. The optical lens system of claim 1, wherein the optical lens system is operated within a wavelength of 850 nanometers to 1000 nanometers.

7. The optical lens system of claim 1, further comprising an aperture stop, wherein an axial distance between the aperture stop and the image-side surface of the second lens element is SD, an axial distance between the object-side surface of the first lens element and the image-side surface of the second lens element is TD, an axial distance between the first lens element and the second lens element is T12, a central thickness of the first lens element is CT1, and the following conditions are satisfied:

$$0.95 < SD/TD < 1.10; \text{ and}$$

$$0 < T12/CT1 < 0.7.$$

8. The optical lens system of claim 1, further comprising an aperture stop, wherein an axial distance between the aperture stop and the image-side surface of the second lens element is SD, an axial distance between the object-side surface of the first lens element and the image-side surface of the second lens element is TD, the axial distance between the object-side surface of the first lens element and the image surface is TL, a maximum image height of the optical lens system is ImgH, and the following conditions are satisfied:

$$0.75 < SD/TD < 1.20; \text{ and}$$

$$1.70 < TL/ImgH < 3.0.$$

9. The optical lens system of claim 1, wherein each of the first lens element and the second lens element is made of plastic material, and each of the object-side surface and the image-side surface of each of the first lens element and the second lens element is aspheric;

wherein the axial distance between the object-side surface of the first lens element and the image surface is TL, a focal length of the optical lens system is f, and the following condition is satisfied:

$$0.8 < TL/f < 2.5.$$

10. The optical lens system of claim 1, wherein a maximum value among refractive indices of all lens elements of the optical lens system is Nmax, the Abbe number of the second lens element is V2, the maximum field of view of the optical lens system is FOV, and the following conditions are satisfied:

$$1.60 < Nmax < 1.75;$$

$$10.0 < V2 < 30.0; \text{ and}$$

$$65 \text{ [deg.]} < FOV < 100 \text{ [deg.]}.$$

11. The optical lens system of claim 1, wherein the object-side surface of the second lens element has at least one critical point in an off-axis region of a concave surface thereof, and the image-side surface of the second lens element has at least one critical point in an off-axis region of a convex surface thereof.

12. The optical lens system of claim 1, wherein a curvature radius of the object-side surface of the first lens element is larger than a curvature radius of the object-side surface of the second lens element.

13. The optical lens system of claim 1, wherein an absolute value of a focal length of the first lens element is larger than an absolute value of a focal length of the second lens element.

14. A time of flight sensing module, comprising:

an emitter; and a receiver, comprising the optical lens system of claim 1, wherein a height of the time of flight sensing module is smaller than 3.0 millimeters.

15. An optical lens system comprising two lens elements, the two lens elements being, in order from an object side to an image side along an optical path, a first lens element and a second lens element, and each of the two lens elements has an object-side surface facing toward the object side and an image-side surface facing toward the image side;

wherein the object-side surface of the first lens element is convex in a paraxial region thereof, at least one of the object-side surface and the image-side surface of at least one lens element of the optical lens system is aspheric, and a total number of the lens elements in the optical lens system is two;

wherein the optical lens system further comprises an aperture stop, an Abbe number of the first lens element is Vi, an Abbe number of the second lens element is V2, an Abbe number of the i-th lens element is Vi, a refractive index of the first lens element is N1, a refractive index of the second lens element is N2, a refractive index of the i-th lens element is Ni, a minimum value of Vi/Ni is (Vi/Ni)min, an axial distance between the aperture stop and the image-side surface of the second lens element is SD, an axial distance between the object-side surface of the first lens element and the image-side surface of the second lens element is TD, an axial distance between the object-side surface of the first lens element and an image surface is TL, a maximum field of view of the optical lens system is FOV, a relative illumination on an image periphery of the optical lens system is RI, and the following conditions are satisfied:

$10.0 < V1 + V2 < 50.0;$ $(Vi/Ni)\text{min} < 13.0, \text{ wherein } i = 1 \text{ or } 2;$ $0.75 < SD/TD < 1.20;$ $0.10 \text{ [mm]} < TL < 3.0 \text{ [mm]};$ $60 \text{ [deg.]} < FOV < 110 \text{ [deg.]}; \text{ and}$ $50\% < RI.$

16. The optical lens system of claim 15, wherein an axial distance between the first lens element and the second lens element is T12, a central thickness of the first lens element is CT1, and the following condition is satisfied:

$0 < T12/CT1 \leq 0.40.$

17. The optical lens system of claim 15, wherein the axial distance between the object-side surface of the first lens element and the image surface is TL, a focal length of the optical lens system is f, and the following condition is satisfied:

$1.26 \leq TL/f \leq 2.14.$

18. The optical lens system of claim 15, wherein the second lens element has positive refractive power;

wherein the Abbe number of the first lens element is V1, the refractive index of the first lens element is N1, and the following condition is satisfied:

$5.0 < V1/N1 \leq 12.5.$

19. The optical lens system of claim 15, wherein the image-side surface of the first lens element is concave in a paraxial region thereof and has at least one critical point in an off-axis region of a convex surface thereof.

20. A time of flight sensing module, comprising:

an emitter; and a receiver, comprising the optical lens system of claim 15.

\* \* \* \* \*